(12) United States Patent
Akou et al.

(10) Patent No.: US 8,227,107 B2
(45) Date of Patent: Jul. 24, 2012

(54) CYLINDRICAL SECONDARY BATTERY HAVING STRUCTURE IN WHICH ELECTRODE ASSEMBLY IS CONNECTED WITH SEALING COVER VIA COMBINATION OF CURRENT COLLECTOR PLATE AND CURRENT COLLECTOR LEAD

(75) Inventors: Atsutoshi Akou, Tokushima (JP); Ryu Yamashita, Tokushima (JP); Makoto Ochi, Tokushima (JP); Kazuhiro Kitaoka, Tokushima (JP); Yuuji Shinohara, Tokushima (JP); Hiromasa Sugii, Tokushima (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 350 days.

(21) Appl. No.: 12/609,814

(22) Filed: Oct. 30, 2009

(65) Prior Publication Data
US 2010/0112434 A1 May 6, 2010

(30) Foreign Application Priority Data

Oct. 31, 2008 (JP) ................................. 2008-281546
Sep. 30, 2009 (JP) ................................. 2009-225982

(51) Int. Cl.
*H01M 2/26* (2006.01)
(52) U.S. Cl. ......... 429/161; 429/121; 429/175; 429/170
(58) Field of Classification Search .................. 429/121, 429/161, 175, 170
See application file for complete search history.

(56) References Cited

U.S. PATENT DOCUMENTS 6,465,122 B1 * 10/2002 Kitaoka et al. .................. 429/54
2009/0208830 A1 * 8/2009 Okabe et al. .................. 429/121

FOREIGN PATENT DOCUMENTS

| EP | 1079449 A1 | 2/2001 |
| JP | 2004-235036 A | 8/2004 |
| WO | 2006/129778 A1 | 12/2006 |
| WO | WO 2006129778 A1 * | 12/2006 |

OTHER PUBLICATIONS

European Search Report dated Jan. 22, 2010 issued in corresponding European Patent Application No. 09013651.6.

* cited by examiner

*Primary Examiner* — Barbara Gilliam
*Assistant Examiner* — Zachary Best
(74) *Attorney, Agent, or Firm* — Westerman, Hattori, Daniels & Adrian, LLP

(57) ABSTRACT

A cylindrical secondary battery comprises a current collector assembly that electrically connects the sealing cover with a core of one of the positive electrode plate and the negative electrode plate. The current collector assembly is composed of a combination of a current collector plate having a plate shape that is provided on an upper part of the electrode assembly and a current collector lead including a cylindrical part having opposed top and bottom parts and an axis along a main surface of the current collector plate, the top part is joined to a sealing plate that is a bottom surface of the sealing cover, and the bottom part is joined to the current collector plate The current collector lead further includes at least one rectangular tab part extending from an opening edge of the cylindrical part in a direction of the axis, and electrically connected with the current collector plate.

7 Claims, 18 Drawing Sheets

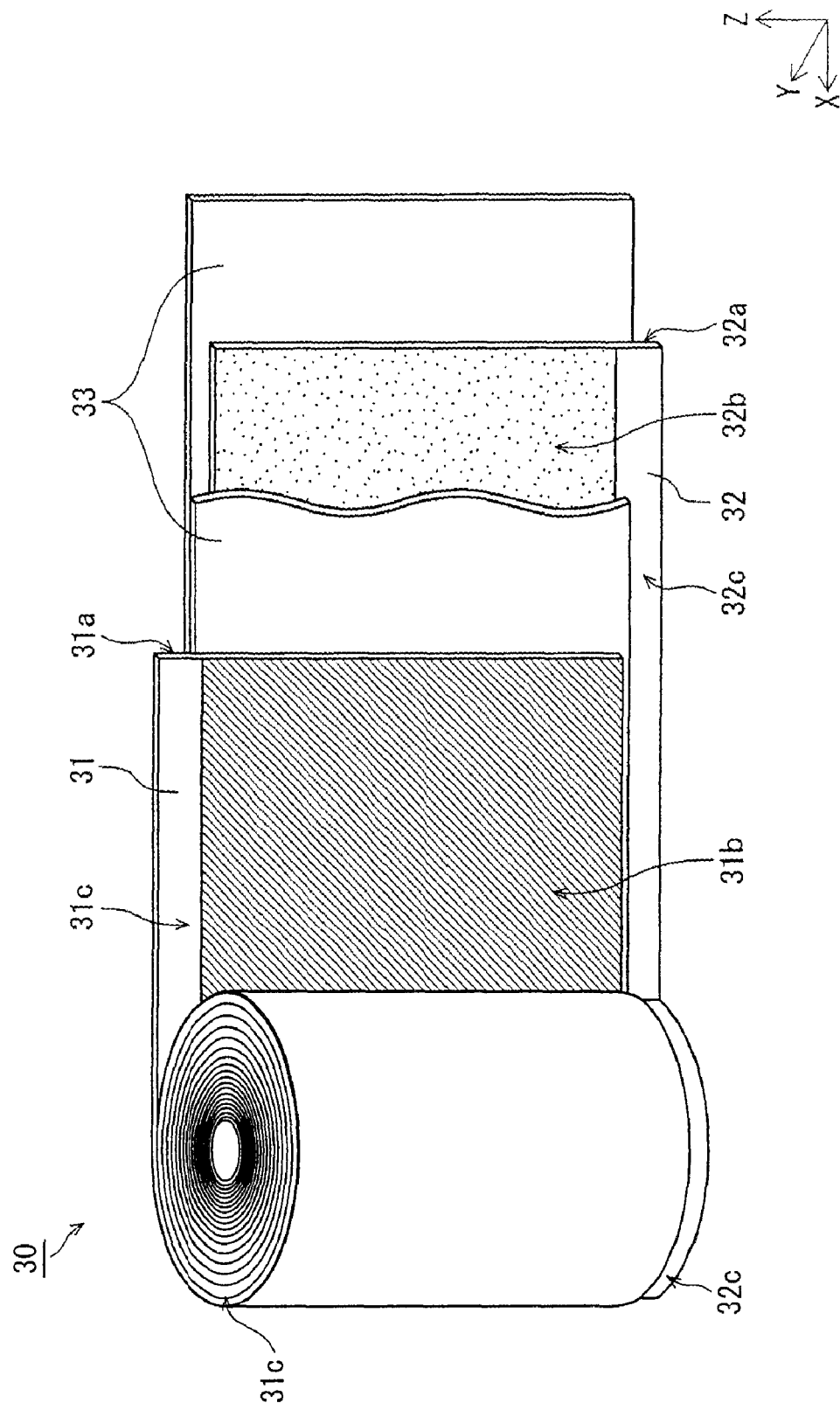

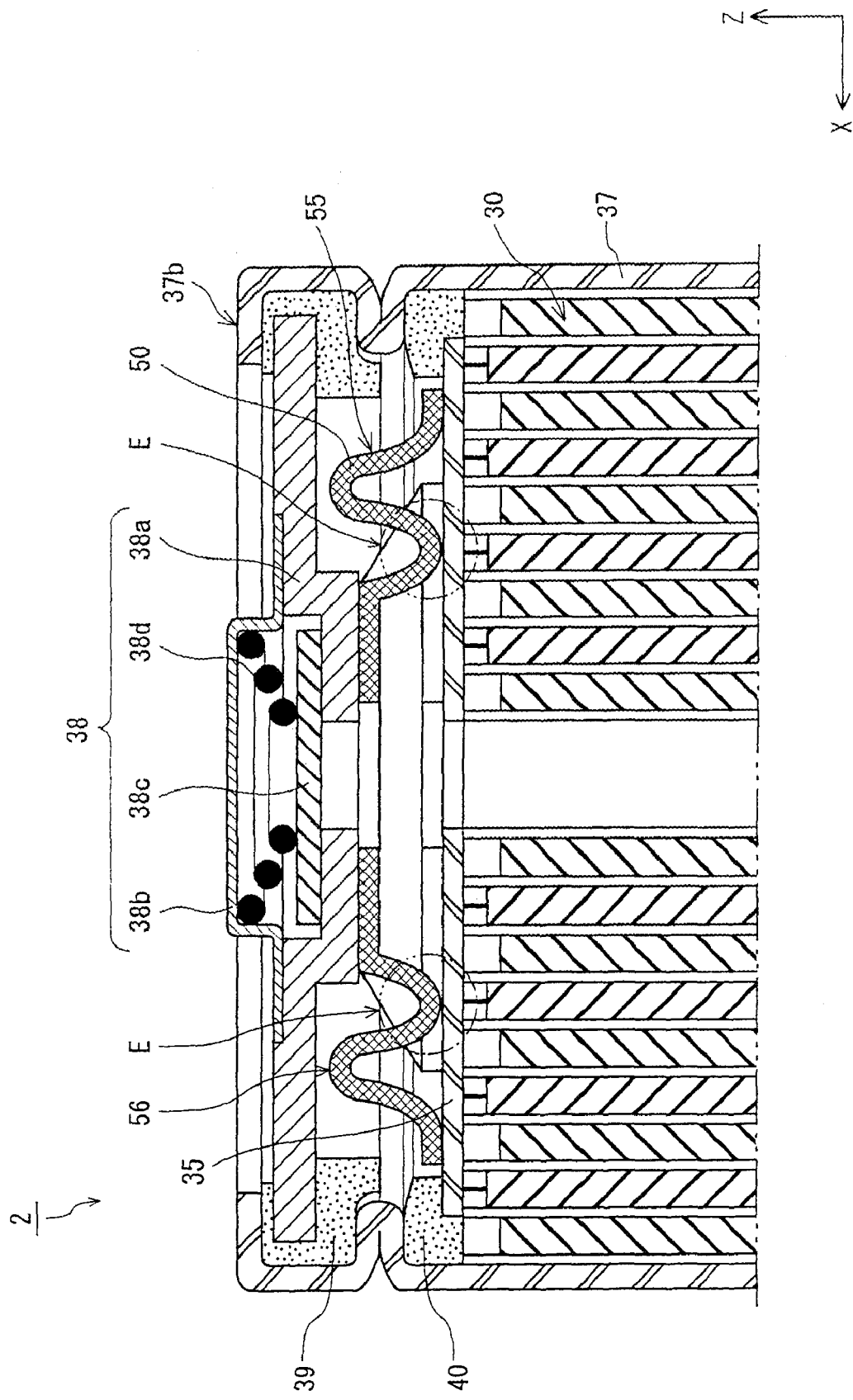

FIG. 14A
FIG. 14C
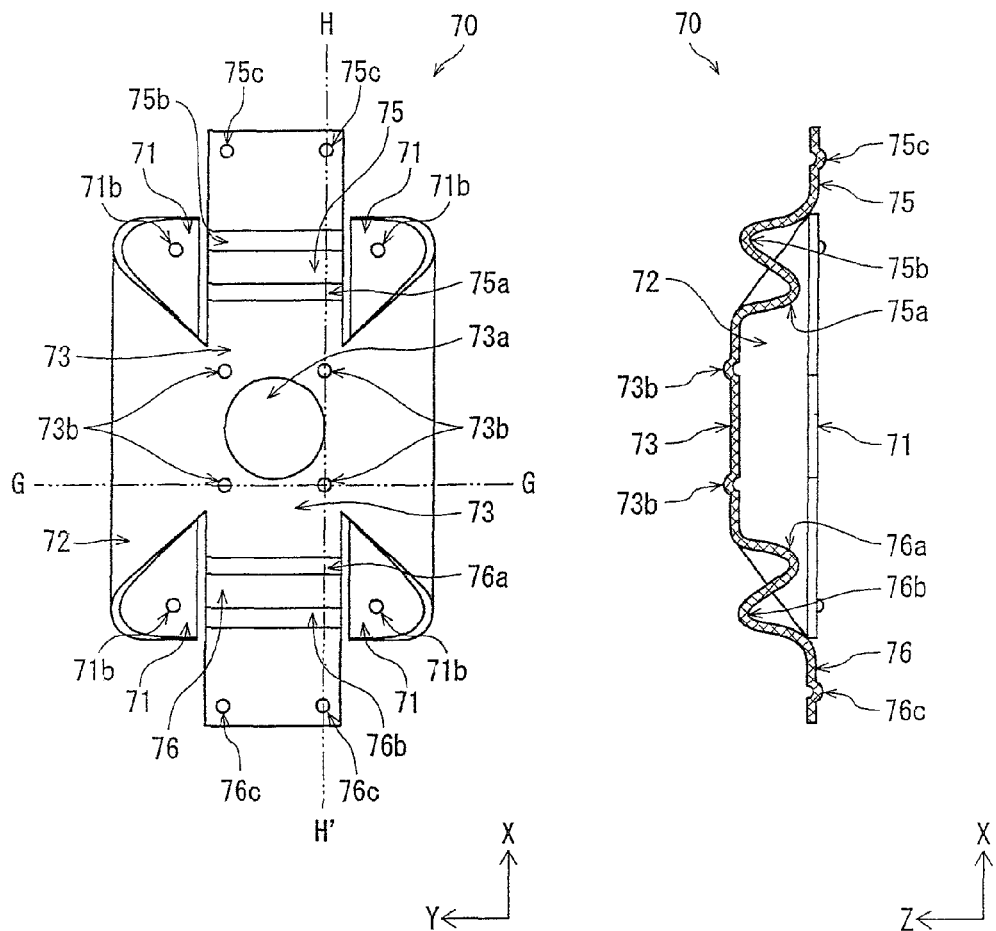
FIG. 14B
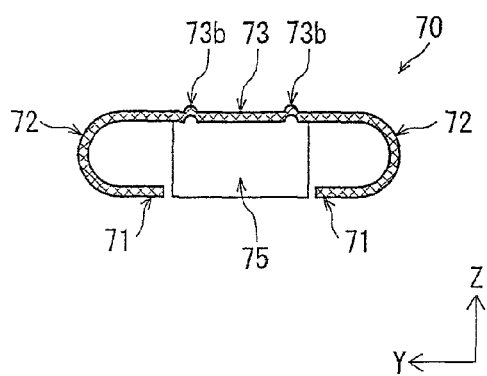

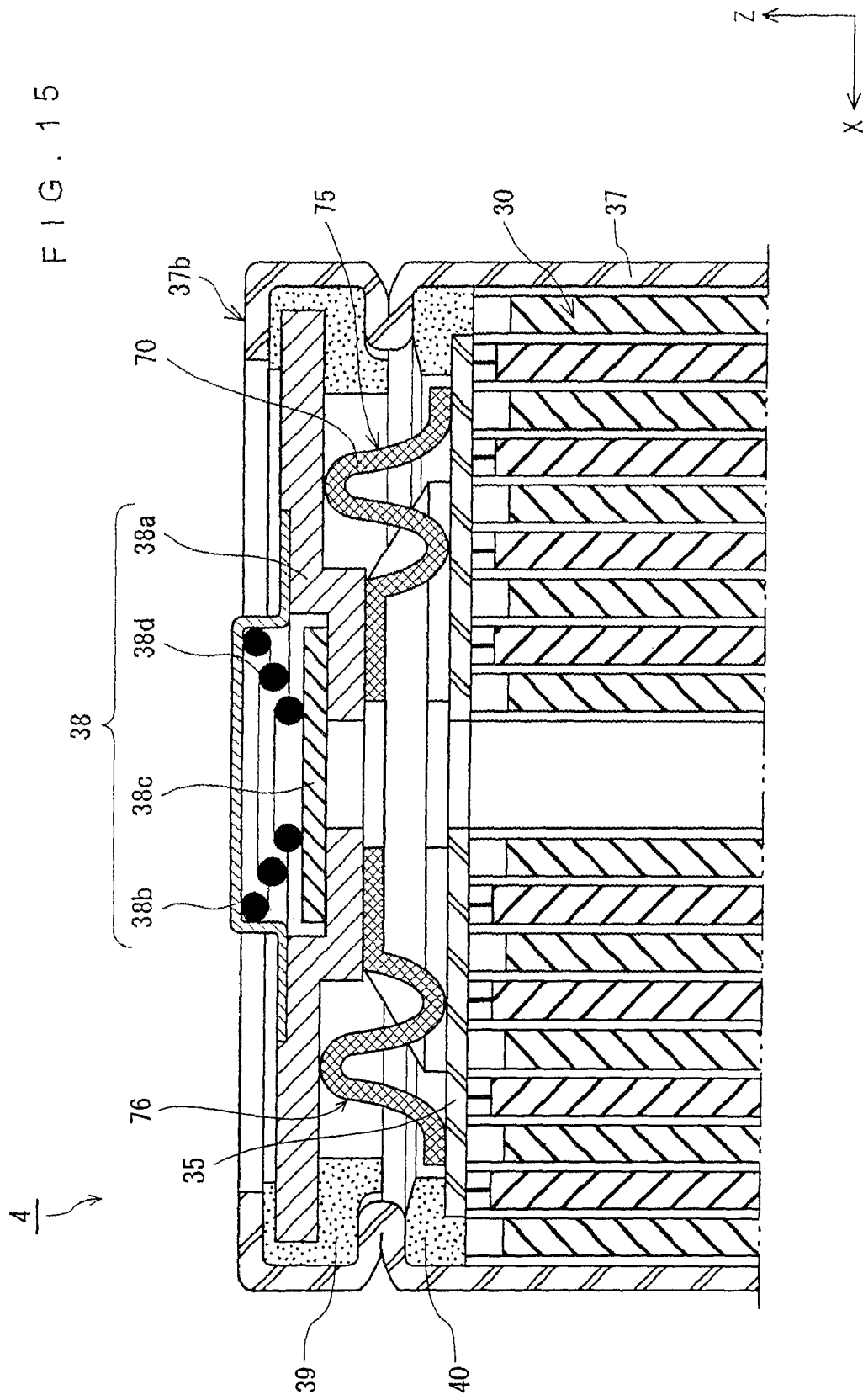

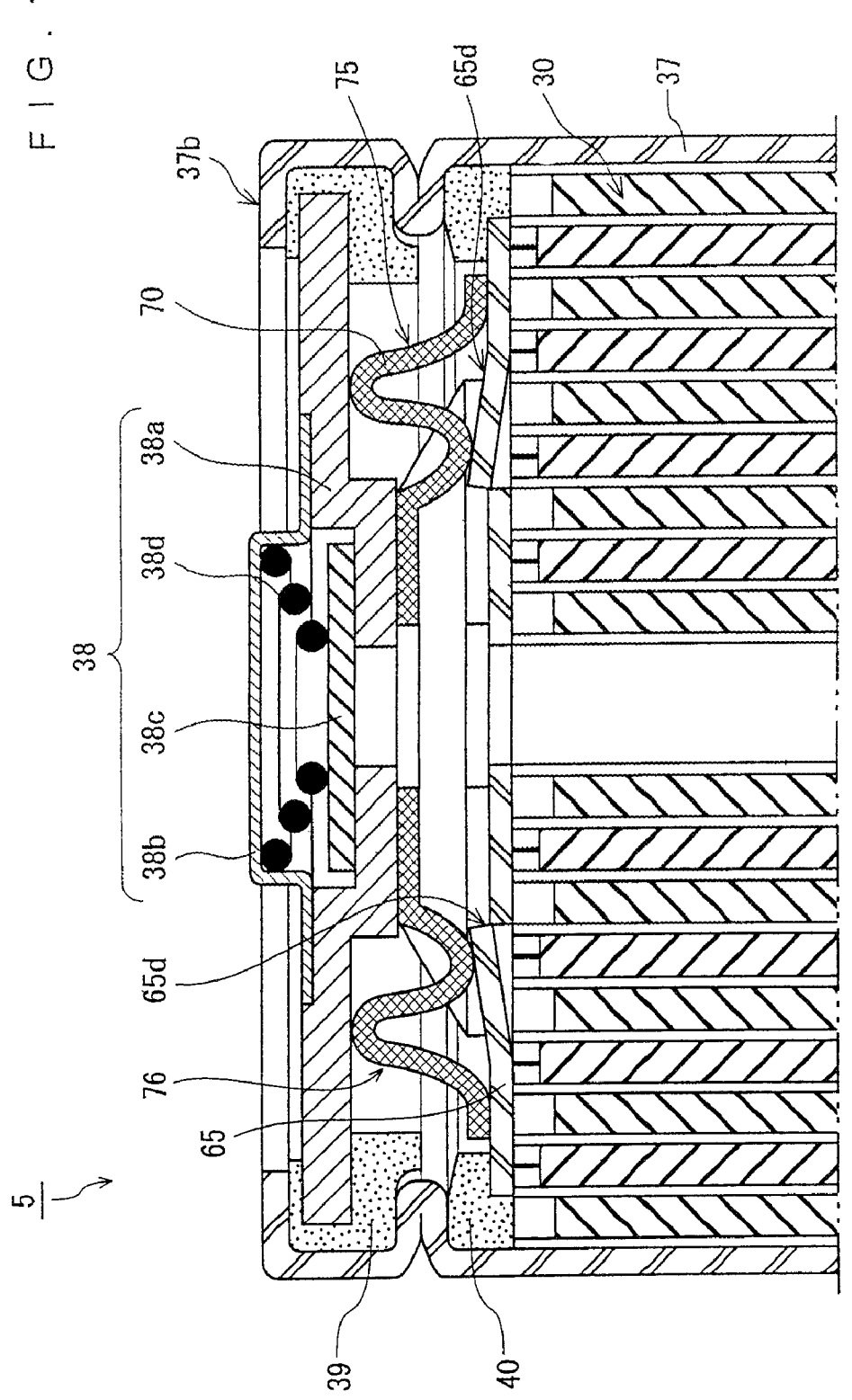

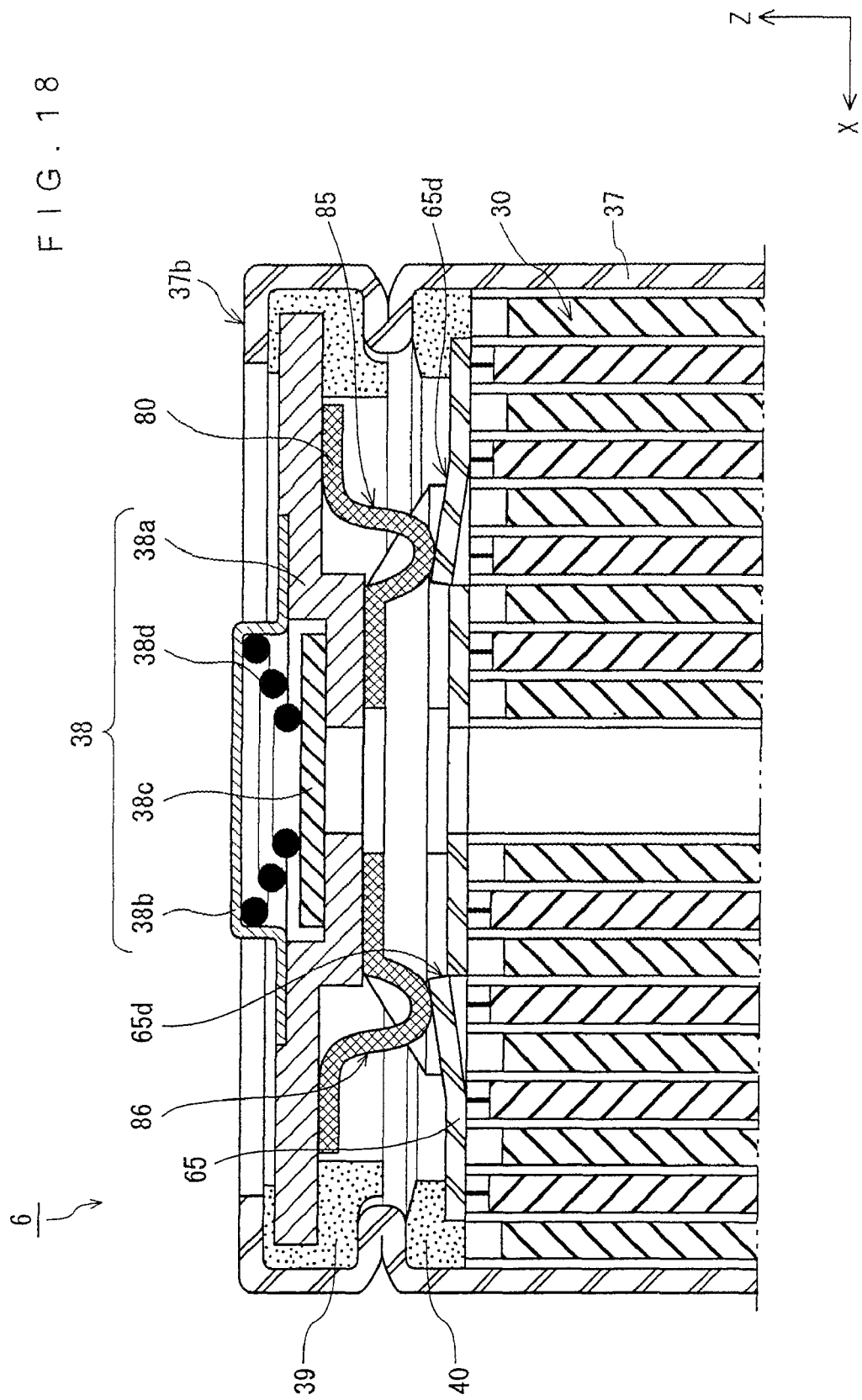

CYLINDRICAL SECONDARY BATTERY HAVING STRUCTURE IN WHICH ELECTRODE ASSEMBLY IS CONNECTED WITH SEALING COVER VIA COMBINATION OF CURRENT COLLECTOR PLATE AND CURRENT COLLECTOR LEAD

BACKGROUND OF THE INVENTION (1) Field of the Invention

The present invention relates to a cylindrical secondary battery such as a nickel-hydrogen secondary battery, and particularly to a structure of a current collector plate joined to one of cores that extends from an upper part of an electrode assembly and a current collector lead used for connecting the electrode assembly with a sealing cover.

(2) Related Art

Generally, a cylindrical secondary battery such as a nickel-hydrogen secondary battery is used for an electric source of an HEV (Hybrid Electric Vehicle) and a PEV (Pure Electric Vehicle). For such a use purpose, there has been a demand for increasing the output efficiency of the cylindrical secondary battery and reducing the electrical resistance within the battery.

In response to such a demand, Japanese Patent Application Publication No. 2004-235036 for example proposes a positive current collector lead that is inserted between a positive current collector plate and a sealing cover and is used for electrically connecting therebetween. The following describes an art disclosed in Japanese Patent Application Publication No. 2004-235036, with reference to FIG. 1, FIG. 2A, and FIG. 2B.

As shown in FIG. 1, a cylindrical secondary battery 901 has the structure in which an outer casing can 937 having a cylinder shape with a closed bottom houses therein an electrode assembly 930 that has been spirally wound, an opening end edge 937b is caulked such that a sealing cover 938 is provided at an opening of the outer casing can 937. An insulating gasket 939 is inserted between the sealing cover 938 and an internal surface of the outer casing can 937.

The electrode assembly 930 is composed of a positive electrode plate 931 and a negative electrode plate 932 with a separator 933 inserted therebetween. An upper part and a lower part of the electrode assembly 930 are welded and joined to a positive current collector plate 935 and a negative current collector plate 934 in the Z-axis direction, respectively. The negative current collector plate 934 is welded and joined to a can bottom 937c of the outer casing can 937. The positive current collector plate 935 is joined to an inner bottom surface of a sealing plate 938a of the sealing cover 938 via a positive current collector lead 910. Note that the operations of the positive current collector plate 935 are controlled by inserting a vibration-proof ring 940 between an inner surface of a sidewall of the outer casing can 937 and an inner surface of a reduced-diameter part 937a.

The sealing cover 938 is composed of the sealing plate 938a and a positive electrode cap 938b, and a valve plate 938c and a spring 938d that are housed in an internal space formed by the sealing plate 938a and the positive electrode cap 938b.

As shown in FIG. 2A, the positive current collector lead 910 is a single metal plate that has been bent so as to have a cylinder shape, and has a cylinder top part 911 joined to the sealing plate 938a and a cylinder bottom part 912 joined to the positive current collector plate 935. Also, an opening part 911a is formed in the cylinder top part 911 for inserting a welding electrode at a time when the negative current collector plate 934 is welded to the can bottom 937c of the outer casing can 937. Furthermore, projections 911b and 912b are respectively provided in the cylinder top part 911 and the cylinder bottom part 912, as welding points.

As shown in FIG. 2B, the cylinder bottom part 912 of the positive current collector lead 910 is welded and joined to the positive current collector plate 935 at the projections 912b as welding points. Note that the positive current collector plate 935 has provided therein a plurality of burring holes 935a for joining to a core of the positive electrode plate 931 of the electrode assembly 930 and slits 935b for protecting the eddy current.

According to the cylindrical secondary battery 901 proposed in Japanese Patent Application Publication No. 2004-235036, as shown in FIG. 1, the positive current collector plate 935 is connected with the sealing plate 938a via the positive current collector lead 910 having a cylinder shape. Accordingly, the electrical resistance is reduced and as a result the output loss can be reduced, compared with the connection configuration using a lead plate having a rectangle shape.

However, there has been a demand for further reduction in the electrical resistance of a cylindrical secondary battery. The cylindrical secondary battery 901 proposed in Japanese Patent Application Publication No. 2004-235036 does not sufficiently satisfy such a demand, and accordingly further improvement is necessary.

Here, according to the cylindrical secondary battery 901 proposed in Japanese Patent Application Publication No. 2004-235036, there is a limited space formed between the positive current collector plate 935 and the sealing cover 938 in the outer casing can 937. Accordingly, it is substantially difficult to broaden a cylinder width of the positive current collector lead 910. Also, there is a method to be considered, for increasing a plate thickness of the positive current collector lead 910. However, if this method is adopted, the rigidity of the positive current collector lead 910 is increased, and it is difficult to reduce the overall height of the battery. As a result, a problem will occur such as the reduction in the sealing performance or the energy density of the battery.

Especially, in the case of a cylindrical secondary battery for HEV or PEV, after the positive current collector plate 935 is welded and joined to the sealing plate 938a and the positive current collector lead 910, the sealing cover 938 is pressed toward the can bottom 937c of the outer casing can 937 so as to reduce the overall height of the battery. However, if the thickness of the positive current collector lead 910 is increased, it is difficult to perform such a press process.

SUMMARY OF THE INVENTION

The present invention is made in order to solve the above problem, and aims to provide a cylindrical secondary battery capable of reducing the internal electrical resistance to reduce the output loss and maintaining the high energy efficiency.

In order to achieve the above aim, the cylindrical secondary battery relating to the present invention has the following characteristics.

The cylindrical secondary battery relating to the present invention comprises: an electrode assembly that is composed of a positive electrode plate and a negative electrode plate with a separator therebetween that are overlaid with each other and spirally wound; an outer casing that has a cylindrical shape with a closed bottom, and houses therein the electrode assembly; a sealing cover that seals an opening of the outer casing, and is one of electrode terminals; a current collector assembly that is inserted between the electrode assembly and the sealing cover, and electrically connects the sealing cover with a core of one of the positive electrode plate and the negative electrode plate, wherein the current collector assembly is composed of a combination of (i) a current collector plate having a plate shape (metal plate) that is provided on an end surface of the electrode assembly in a side in which the sealing cover is provided, and is joined to the core and (ii) a current collector lead that includes a cylindrical part having an axis in a direction along a main surface of the current collector plate, the cylindrical part includes a top part and a bottom part whose peripheral surfaces oppose each other, the top part is welded and joined to a bottom surface of the sealing cover (a sealing plate), and the bottom part is welded and joined to the current collector plate. Note that the current collector lead is a metal plate that has been bent.

According to the cylindrical secondary battery relating to the present invention, the current collector lead further includes at least one tab part having a rectangle shape that extends from an opening edge of the cylindrical part in a direction of the axis, and the tab part is at least partially electrically connected with the current collector plate at a region from a root portion to a tip portion thereof.

According to the cylindrical secondary battery relating to the present invention, the current collector plate is connected with the sealing cover via the tab part in addition to via the cylindrical part of the current collector lead. Accordingly, the cylindrical secondary battery relating to the present invention can reduce the output loss by increasing the energizing path between the current collector plate and the sealing cover and reducing the electrical resistance therebetween, compared with the cylindrical secondary battery proposed in Japanese Patent Application Publication No. 2004-235036.

Also, the cylindrical secondary battery relating to the present invention can reduce the electrical resistance between the current collector plate and the sealing cover as described above, without increasing the width and thickness of the cylindrical part of the current collector lead. Accordingly, there is no necessity to form a large space between the current collector plate and the sealing cover, and it is possible to exhibit an effect in energy efficiency.

Therefore, the cylindrical secondary battery relating to the present invention can exhibit an effect that it is possible to reduce the output loss by the effect of the reduction in the internal electrical resistance and maintain high energy efficiency.

The cylindrical secondary battery relating to the present invention may adopt the following variations, for example.

According to the cylindrical secondary battery relating to the present invention having the above structure, it is possible to adopt a structure in which the tab part has a middle portion bent to have a wave shape with an amplitude in a direction that connects the current collector plate with the sealing cover, the middle portion being between the root portion and the tip portion. Although the middle portion bent to have the wave shape does not necessarily need to be provided in the component level, it is necessary to compress the outer casing in its axis direction after the sealing cover is joined to the current collector lead. In other words, by providing a part bent to have a wave shape in the tab part of the current collector lead, it is possible to eliminate unnecessary space in the cylindrical secondary battery.

According to the cylindrical secondary battery relating to the present invention having the above structure, it is possible to adopt a structure in which the tab part is electrically connected with the current collector plate at the tip portion by welding and joining the tip portion to the current collector plate. With this structure, an energizing path is ensured via the position at which the tab part of the current collector lead is welded and joined to the current collector plate. As a result, it is possible to surely reduce the electrical resistance between the current collector plate and the sealing cover.

According to the cylindrical secondary battery relating to the present invention having the above structure, it is possible to adopt a structure in which the tab part contacts with the current collector plate at a wave trough of the middle portion, and is further electrically connected with the current collector plate at the wave trough. With this structure, it is possible to realize electrical connection between the tab part of the current collector lead and the current collector plate at both the point at which the tap part is welded and joined to the current collector plate and the point at which the tab part contacts with the current collector plate. This can further reduce the electrical resistance.

According to the cylindrical secondary battery relating to the present invention having the above structure, it is possible to adopt a structure in which the middle portion is bent to have an S-shape or a Z-shape, and contacts with the sealing cover at a wave crest of the middle portion. With this structure, a part is additionally provided for electrically connecting the current collector lead with the sealing cover. This can further reduce the electrical resistance.

According to the cylindrical secondary battery relating to the present invention having the above structure, it is possible to adopt a structure in which the tab part is welded and joined to the sealing plate at the tip portion, contacts with the current collector plate at a wave trough of the middle portion, and is electrically connected with the current collector plate at the wave trough. With this structure, the electrical connection with the current collector plate is performed at a contact point, and electrical connection with the sealing cover is performed by performing welding and joining.

According to the cylindrical secondary battery relating to the present invention having the above structure, it is possible to adopt a structure in which a part of the current collector plate with which the wave trough contacts is cut and raised toward the tab part. With this structure, the tab part of the current collector lead and the current collector plate are elastically biased towards each other, and as a result the variation in electrical resistance therebetween can be reduced. Also, the output variation can be reduced.

According to the cylindrical secondary battery relating to the present invention having the above structure, it is possible to adopt a structure in which the current collector lead has a plurality of projections formed therein, and is welded and joined to the current collector plate and the sealing cover at the projections as welding points. By providing the projection in this way, when the current collector lead is welded and joined to the sealing cover and the current collector plate, a welding current is concentrated on contact points at which top parts of the projections contact with the sealing cover and the current collector plate.

According to the cylindrical secondary battery relating to the present invention having the above structure, it is possible to adopt a structure in which the current collector lead is a single metal plate that has been bent. With such a structure, it is possible to reduce the number of processes for manufacturing the current collector lead and the number of components thereof. This can reduce the production cost of the battery.

According to the cylindrical secondary battery relating to the present invention having the above structure, it is possible to adopt a structure in which the cylindrical part of the current collector lead is flat, and has a height, in a connection direction that connects the current collector plate with the sealing cover, that is smaller than a width in a direction perpendicular to the connection direction. With this structure, by compressing the cylindrical part so as to be flat, it is possible to reduce the overall height of the battery, and as a result achieve a higher energy density.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 4 is a perspective view showing an electrode assembly 30 included in the cylindrical secondary battery 1;

FIG. 11 is a cross sectional view showing a part of the cylindrical secondary battery 2 relating to the second embodiment;

FIG. 14A is a top view showing a positive current collector lead 70 included in a cylindrical secondary battery 4 relating to a fourth embodiment;

FIG. 14B is a cross sectional view showing a cylindrical part included in the positive current collector lead 70 along a line G-G';

FIG. 14C is a cross sectional view showing tab parts included in the positive current collector lead 70 along a line H-H';

FIG. 15 is a cross sectional view showing a part of the cylindrical secondary battery 4 relating to the fourth embodiment;

FIG. 16 is a cross sectional view showing a part of a cylindrical secondary battery 5 relating to a fifth embodiment;

FIG. 18 is a cross sectional view showing a part of the cylindrical secondary battery 6 relating to the sixth embodiment.

DESCRIPTION OF PREFERRED EMBODIMENTS

The following describes preferred embodiments for implementing the present invention with use of some examples. The embodiments used in the following description are examples for easily explaining the structures and effects of the present invention. The present invention is not limited by the following embodiments except essential points thereof.

[First Embodiment]

In a first embodiment, a nickel-hydrogen secondary battery having a cylindrical appearance is used as an example.

1. Whole Structure

Figure 3:
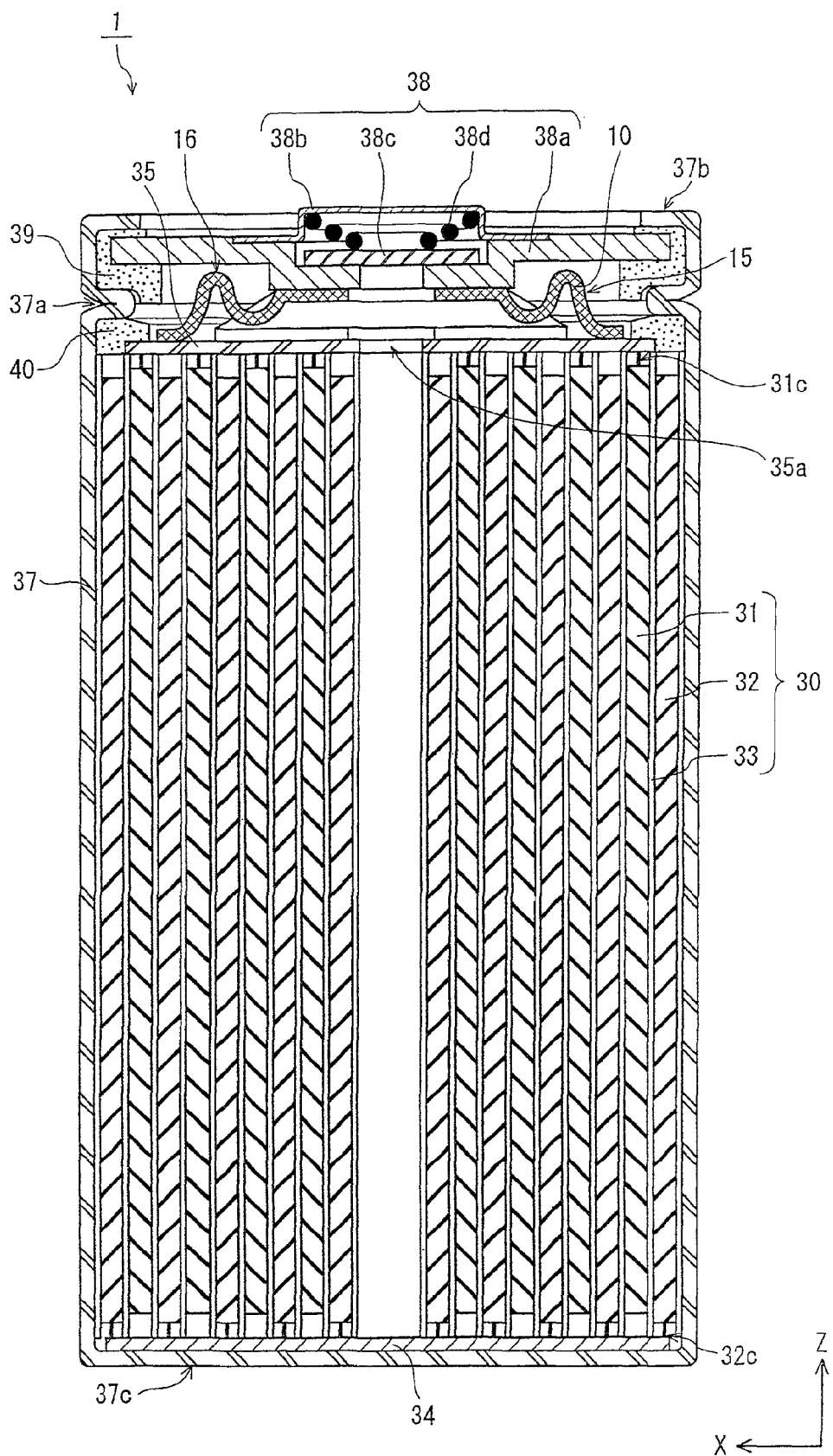
FIG. 3 is a sectional view showing a cylindrical secondary battery 1 relating to a first embodiment.

As shown in FIG. 3, a cylindrical secondary battery (nickel-hydrogen secondary battery having a cylindrical appearance) 1 has the structure in which an electrode assembly 30 is housed in an outer casing can 37 having a cylinder shape with a closed bottom, and a sealing cover 38 is provided in an opening part of the outer casing can 37 for seal. Here, the outer casing can 37 is for example composed of a material of an iron (Fe) on which a nickel (Ni) has been coated.

The electrode assembly 30 is composed of a positive electrode plate 31 and a negative electrode plate 32 with a separator 33 therebetween that are overlaid with each other and then spirally wound. A part of a core of the positive electrode plate 31 (exposed core part 31c) is exposed at an upper end part of the electrode assembly 30 in the Z-axis direction, and a part of a core of the negative electrode plate 32 (exposed core part 32c) is exposed at a lower end part of the electrode assembly 30 in the Z-axis direction.

The positive current collector plate 35 is welded and joined to an upper part of the electrode assembly 30 in the Z-axis direction, and the negative current collector plate 34 is welded and joined to a lower part of the electrode assembly 30 in the Z-axis direction. The positive current collector plate 35 is joined to an edge side of the exposed core part 31c of the positive electrode plate 31, and the negative current collector plate 34 is joined to an edge side of the exposed core part 32c of the negative electrode plate 32. The negative current collector plate 34 is welded and joined to the can bottom 37c of the outer casing can 37.

On the other hand, the positive current collector plate 35 is joined to an inner surface of a sealing plate 38a of the sealing cover 38 via the positive current collector lead 10. Also, the positive current collector plate 35 is provided below a reduced-diameter part 37a that is formed by grooving the outer casing can 37, and a vibration-proof ring 40 is inserted and fixed between an inner surface of the outer casing can 37 and the positive current collector plate 35. In the cylindrical secondary battery 1, the combination of the positive current collector plate 35 and the positive current collector lead 10 functions as a current collector between the electrode assembly 30 and the sealing cover 38.

The sealing cover 38 is provided beneath the outer casing can 37 in the Z-axis direction, and has an appearance composed of the sealing plate 38a having a shallow pan shape and a positive electrode cap 38b welded to an upper part of the sealing plate 38a. A valve body composed of a valve plate 38c and springs 38d is housed in an internal space formed by the sealing plate 38a and the positive electrode cap 38b. The sealing plate 38a and the positive electrode cap 38b each have provided therein a gas vent hole, such that when the internal pressure of the battery exceeds a threshold value, a gas included in the internal space is released to outside.

The sealing cover 38 is provided such that the insulating gasket 39 is inserted between the sealing cover 38 and the inner surface of the outer casing can 37, and is fixed by caulking an opening end edge 37b of the outer casing can 37.

2. Structure of Electrode Assembly 30

As shown in FIG. 4, the electrode assembly 30 of the cylindrical secondary battery 1 has the structure in which the positive electrode plate 31 and the negative electrode plate 32 are overlaid with each other via the separator 33 and then are spirally wound. As described above, the part of the core 31a of the positive electrode plate 31 (exposed core part 31c) is exposed at the upper end part of the electrode assembly 30 in the Z-axis direction. Also, the part of the core 32a of the negative electrode plate 32 (exposed core part 32c) is exposed at the lower end part of the electrode assembly 30 in the Z-axis direction.

The positive electrode plate 31 is a nickel positive electrode plate, and is formed in the following manner.

Firstly, a nickel-sintered porous material 31b is formed on a surface of the core 31a made from a perforated metal, and then an active material that is mainly made of nickel hydroxide is impregnated in pores of the nickel-sintered porous material 31b using a chemical impregnation method. Next, the nickel-sintered porous material 31b is dried up, and then cut so as to have a predetermined size. As a result, the positive electrode plate 31 is completed.

Here, at one of end parts in a width direction of the positive electrode plate 31 (an upper end part in the Z-axis direction), an exposed core part 31c that is an exposed part of the core 31a is formed (see FIG. 4).

The negative electrode plate 32 is a solid metal hydride negative electrode plate, and is manufactured in the following manner.

Firstly, a negative active material 32b in paste form, which is composed of a solid metal hydride and a binder (SBR or CMC) is applied onto a surface of the core 32a made of the perforated metal. Then, the negative active material 32b is dried up, and is extended by applying a pressure so as to have a predetermined thickness. Then, the negative active material 32b is cut so as to have a predetermined size. As a result, the negative electrode plate 32 is completed.

Here, at the other one of the end parts in the width direction of the positive electrode plate 31 (a lower end part in the Z-axis direction), an exposed core part 32c that is an exposed part of the core 32a is formed (see FIG. 4).

3. Structure of Negative Current Collector Plate 34

Figure 5B:
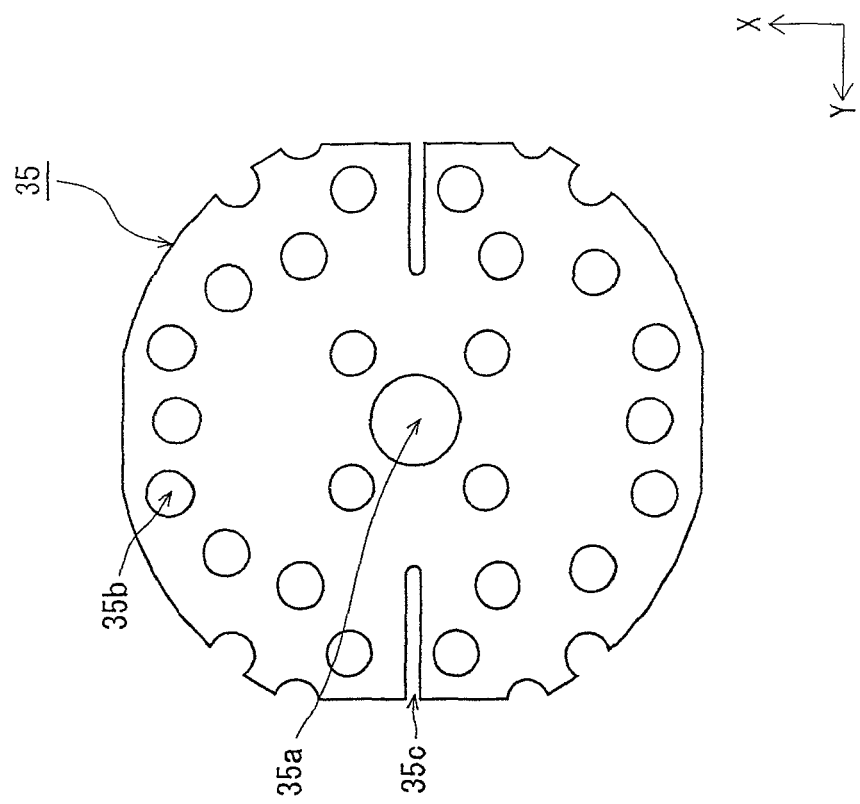
FIG. 5B is a top view showing a positive current collector plate 35.
Figure 5A:
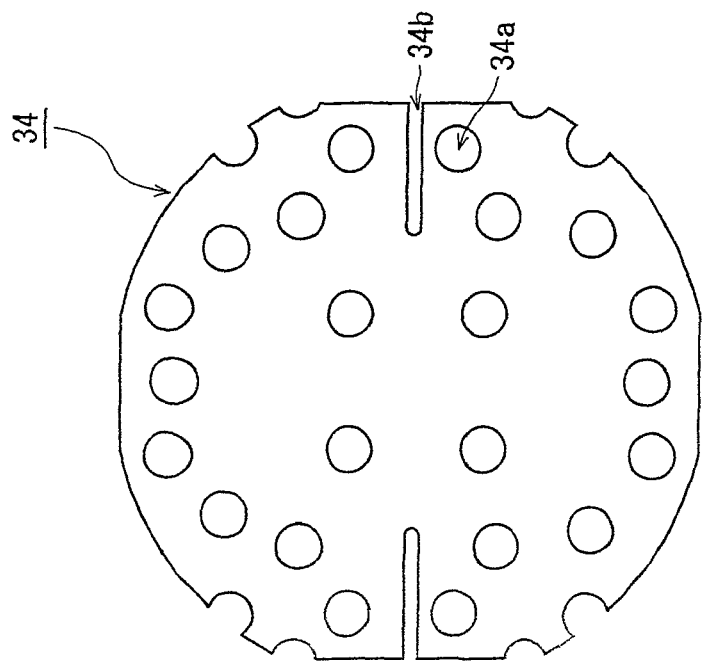
FIG. 5A is a top view showing a negative current collector plate 34.

As shown in FIG. 5A, the negative current collector plate 34 is a plate having a substantially circular shape, and is made of a nickel coated steel having a thickness of 0.4 [mm], for example. A maximum outer diameter of the negative current collector plate 34 is slightly smaller than an inner diameter of the outer casing can 37 (for example, 30 [mm]). A plurality of burring holes 34a are provided on a surface of the negative current collector plate 34. Also, two slits 34b are provided at an outer circumference of the negative current collector plate 34. The burring holes 34a each have a diameter of 2 [mm], a burring height of 0.4 [mm], and a burring thickness of 0.1 [mm].

Also, the slits 34b are provided in the negative current collector plate 34 in order to reduce the ineffective welding current and increase the effective welding current.

4. Positive Current Collector Plate 35

As shown in FIG. 5B, the positive current collector plate 35 is also a plate having a substantially circular shape, and is made of a nickel coated steel having a thickness of 0.4 [mm], for example. A maximum outer diameter of the positive current collector plate 35 is slightly smaller than the inner diameter of the outer casing can 37 (for example, 30 [mm]), like the negative current collector plate 34. The positive current collector plate 35 has a central opening 35a formed at a center thereof. The central opening 35a is provided in the positive current collector plate 35 in order to cause a welding electrode to insert at a time when the negative current collector plate 34 is welded and joined to the can bottom 37c of the outer casing can 37.

Also, a plurality of burring holes 34b are provided on a surface of the positive current collector plate 35, and two slits 35c are provided at an outer circumference of the positive current collector plate 35. The burring holes 35b each have a diameter of 2 [mm], a burring height of 0.4 [mm], and a burring thickness of 0.1 [mm], like the burring holes 34a of the negative current collector plate 34. Also, the slits 35c are provided in the positive current collector plate 35 in order to reduce the ineffective welding current and increase the effective welding current, like the slits 34b of the negative current collector plate 34.

5. Structure of Positive Current Collector Lead 10

The positive current collector lead 10 is manufactured in the following manner.

Figure 6:
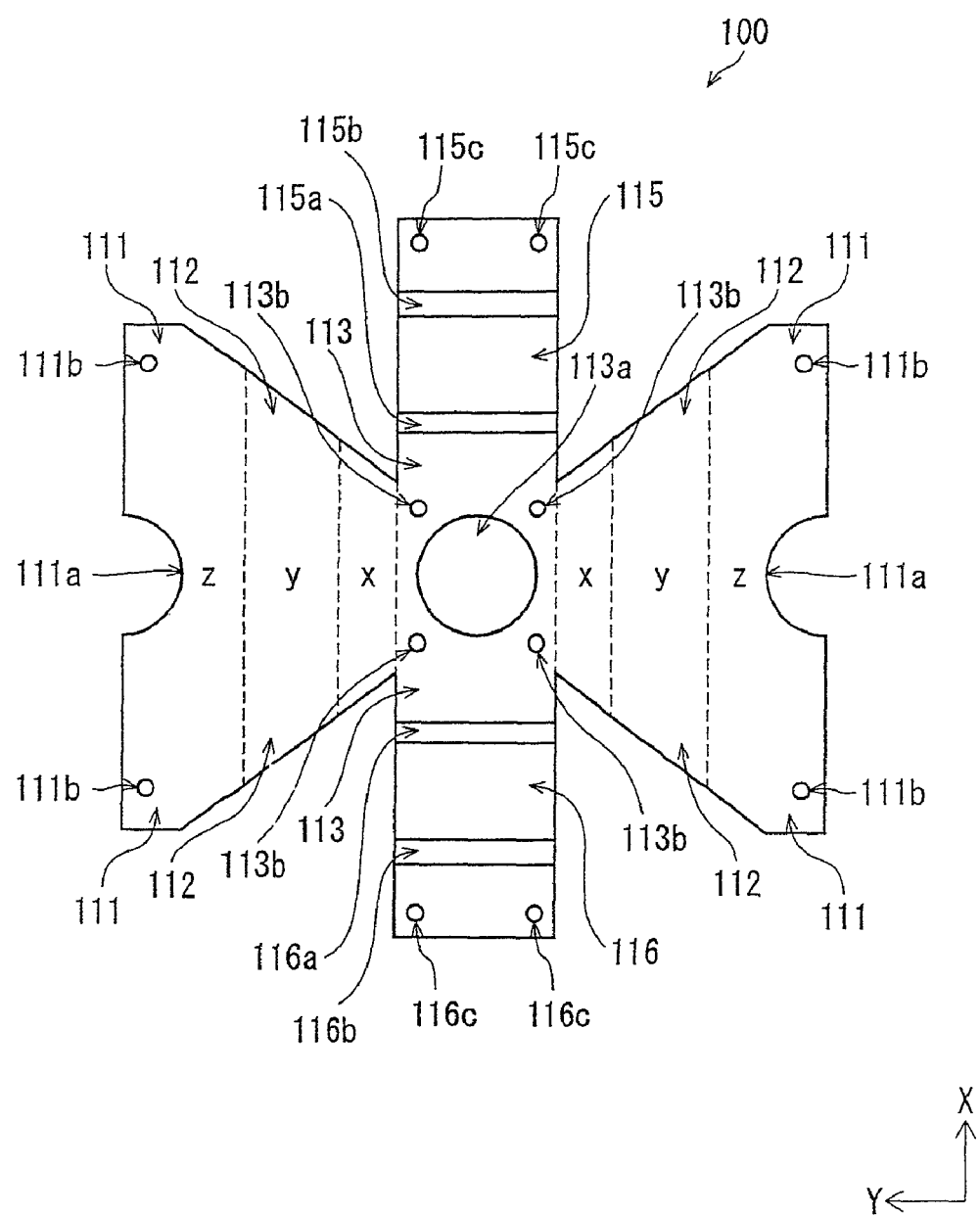
FIG. 6 is a plan view showing a pre-bending plate material 100 for a positive current collector lead.

Firstly, a nickel coated steel (for example, having a thickness of 0.4 [mm]) is prepared, and is cut so as to have a shape as shown in FIG. 6 (punching method) (pre-bending plate material 100). Specifically as shown in FIG. 6, the pre-bending plate material 100 includes a central part (later bent to be a central part of a cylinder top part 13) 113 having a substantially square shape, first and second trapezoidal parts 111 each having a substantial trapezoidal shape in which an upper bottom thereof continues to the central part 113 leftward and rightward in the Y-axis direction of the central part 113, and a lower bottom thereof constitutes an end part thereof (later respectively bent to be one of cylindrical bottom parts 11, one of cylindrical curved parts 12, and a part of the cylindrical top part 13), and first and second rectangle parts 115 and 116 that respectively extend upward and downward in the X-axis direction with respect to the central part 113 so as to each have a substantial rectangle shape (reed shape).

The first and second rectangle parts 115 and 116 of the pre-bending plate material 100 are each formed so as to extend outward in a direction perpendicular to a central line of the first and second trapezoidal parts 111 (line parallel to the Y-axis).

In the above punching process, a central opening 113a is formed in a substantially central part of the central part 113, and a notch 111a having a semicircular (curved) shape is formed in a lower bottom part of each of the first and second trapezoidal parts 111. Furthermore, bent guide parts 115a and 115b, and 116a and 116b are respectively formed in the first and second rectangle parts 115 and 116.

Also, end parts of the first and second rectangle parts 115 and 116 in the longitudinal direction (X-axis direction) respectively extend upward and downward in the X-axis direction with respect to the lower bottom parts of the first and second trapezoidal parts 111.

Also, each of the first and second trapezoidal parts 111 having a substantial trapezoidal shape is composed of regions divided into three sub-regions of an x-region, a y-region, and a z-region from the upper bottom to the lower bottom, as divided by dashed lines for convenience in FIG. 6. Then, after the pre-bending plate material 100 is bent, the x-region partially constitutes the cylinder top part 13, the y-region constitutes the cylinder curved part 12, and the z-region constitutes the cylinder bottom part 11.

Also, as shown in FIG. 6, at the same time of or after the punching process, on corners of each of the end parts of the first and second trapezoidal parts 111 of the pre-bending plate material 100, projections 111b are formed so as to each project forward in FIG. 6. Also, at the same time, projections 113b are formed around the central opening 113a of the central part 113 so as to each project forward in FIG. 6.

Furthermore, at the same time, projections 115c and 116c are formed at end parts of the first and second rectangle parts 115 and 116, respectively, so as to each project forward in FIG. 6. Note that the projections 111b provided in the first and second trapezoidal parts 111 and the projections 115c and 116c respectively provided in the first and second rectangle parts 115 and 116 are each used as a welding point for welding the current collector lead 10 with the positive current collector plate 35. The projections 113b provided in the central part 113 are each used as a welding point for welding the current collector lead 10 with the sealing cover 38.

Figure 7A:
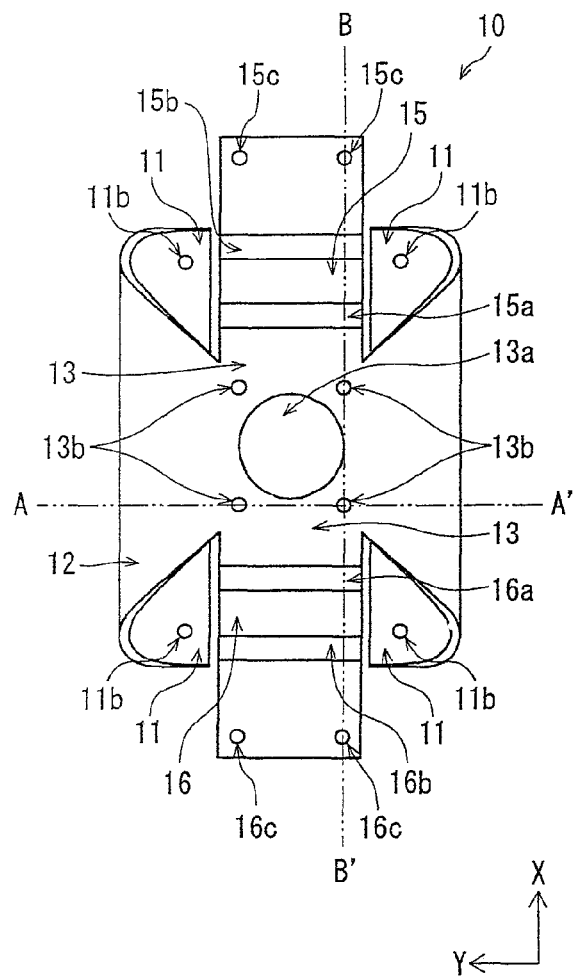
FIG. 7A is a top view showing a positive current collector lead 10.
Figure 7C:
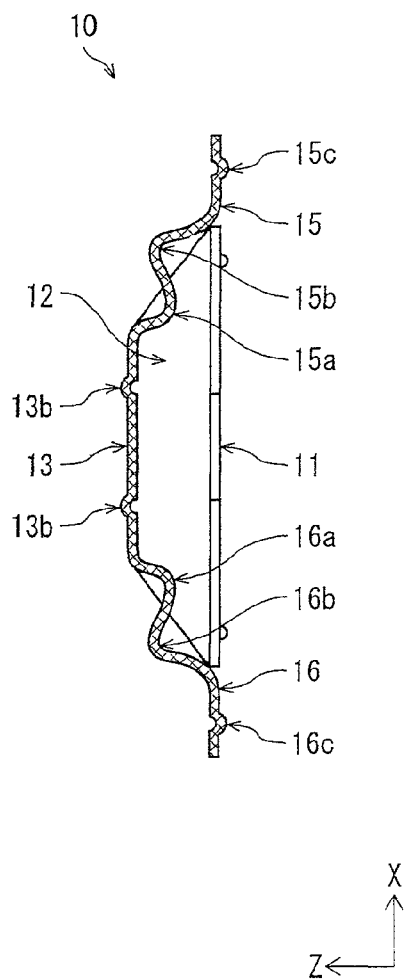
FIG. 7C is a cross sectional view showing tab parts included in the positive current collector lead 10 along a line B-B'.
Figure 7B:
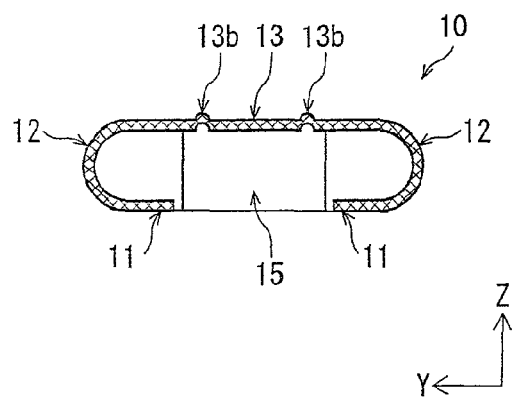
FIG. 7B is a cross sectional view showing a cylindrical part included in the positive current collector lead 10 along a line A-A'.

Next, the pre-bending plate material 100 on which the above punching process has been performed is bent such that the y-regions 112 included in the first and second trapezoidal parts on both left and right sides in the Y-axis direction. As a result, as shown in FIG. 7B, each of the y-regions 112 becomes the cylinder curved part 12, and edge sides of the cylinder bottom part 11 on the left side in the Y-axis direction oppose each other. Also, at the same time, the bent guide parts 115a, 115b, 116a, and 116b respectively provided in the first and second rectangle parts 15 and 16 are preliminarily pressed. As a result, as shown in FIG. 7A and FIG. 7C, a cylindrical part of the positive current collector lead 10 is composed of the cylinder bottom part 11 and the cylinder top part 13 that oppose each other and the cylinder curved part 12. As shown in FIG. 7C, tab parts 15 and 16 each having a rectangle shape are formed, which are each bent so as to have a wave shape with an amplitude in the Z-axis direction. Note that, in the following description, the tab parts 15 and 16 are also collectively abbreviated to "tab parts".

Note that, as shown in FIG. 7C, the tab parts 15 and 16 of the positive current collector lead 10 are each bent in the Z-axis direction so as to have a wave shape, and each two bent guide parts 15a and 15b, and 16a and 16b (wave troughs and wave crests) are formed in the tab parts 15 and 16, respectively.

6. Joint Configuration of Positive Current Collector Plate 35 and Positive Current Collector Lead 10

Figure 8:
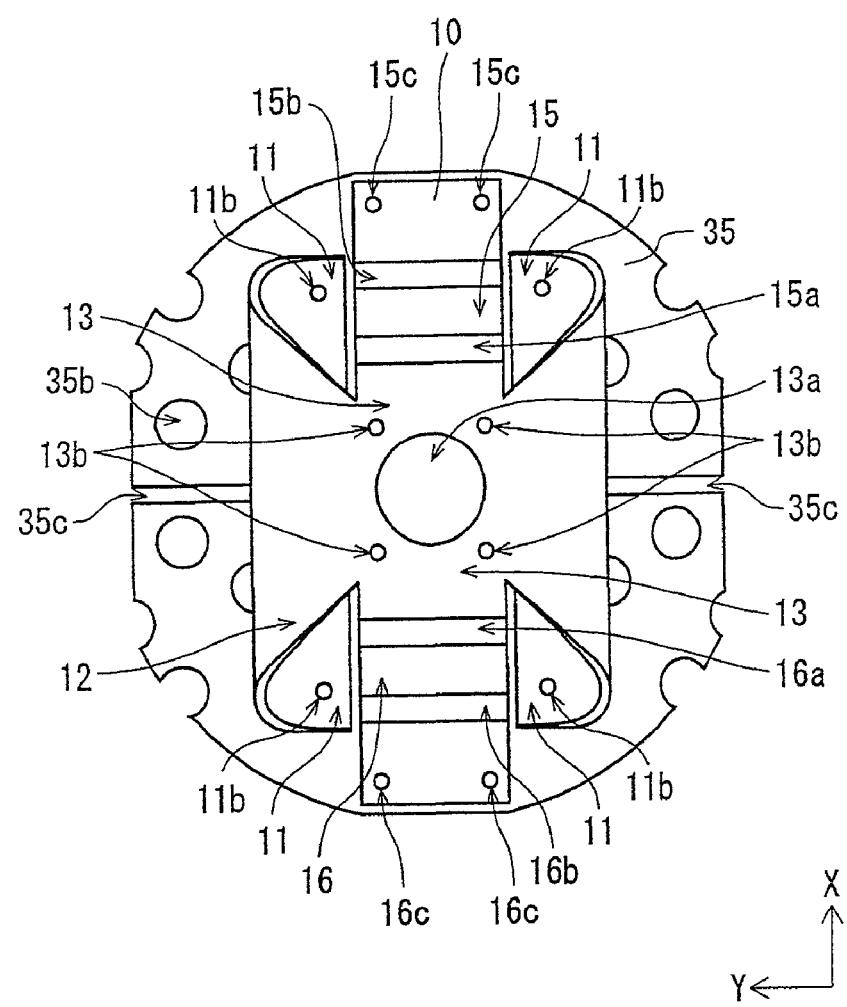
FIG. 8 is a top view showing the positive current collector lead 10 joined to the positive current collector plate 35.

As shown in FIG. 8, the positive current collector lead 10 is placed on one of surfaces (a surface on the front side in FIG. 8) of the positive current collector plate 35, and is welded and joined to the one surface at four projections 11b of the cylinder bottom part 11 as welding points. Also, the tab parts 15 and 16 are welded and joined to the main surface of the positive current collector plate 35 at projections 15c and 16c respectively provided at ends of the tab parts 15 and 16 as welding points.

Note that the positive current collector lead 10 is placed on the positive current collector plate 35 such that a central opening 13a of the cylinder top part 13 of the positive current collector lead 10 corresponds to the central opening 35a of the positive current collector plate 35 (see FIG. 5B) in a direction perpendicular to FIG. 8.

Also, although not shown in FIG. 8 for convenience, the positive current collector plate 35 is joined to the electrode assembly 30 before being welded and joined to the positive current collector lead 10.

7. Battery Manufacturing

Figure 9:
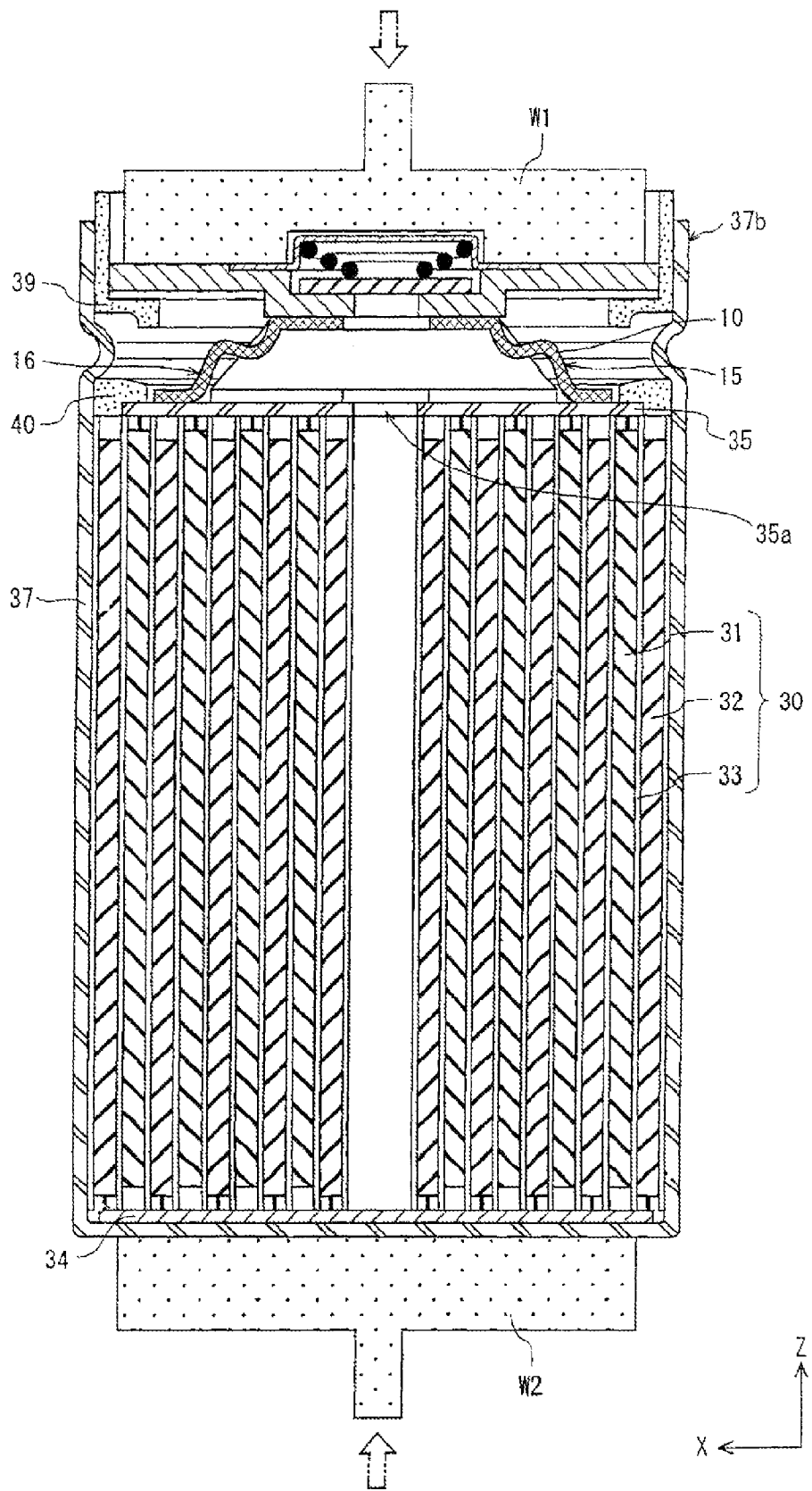
FIG. 9 is a cross sectional view showing the cylindrical secondary battery 1 under manufacture.

As shown in FIG. 9, the electrode assembly 30, which is joined to the positive current collector plate 35, the negative current collector plate 34, and the positive current collector lead 10, is housed in the outer casing can 37 such that the negative current collector plate 34 contacts with an inner surface of the can bottom 37c of the outer casing can 37. Then, a welding electrode is inserted into the outer casing can 37 through the central opening 13a of the positive current collector lead 10, the central opening 35a of the positive current collector plate 35, and furthermore a space formed at a center of the electrode assembly 30. The negative current collector plate 34 is spot-welded to the inner surface of the can bottom 37c of the outer casing can 37 (see FIG. 3). As a result, the negative current collector plate 34 is joined to the outer casing can 37.

Next, the vibration-proof ring 40 is inserted between the inner surface of a sidewall of the outer casing can 37 and an end edge of the positive current collector plate 35. Groove cutting process is performed on a part above a part of the outer casing can 37 in the Z-axis direction into which the vibration-proof ring 40 is inserted. As a result, a reduced-diameter part is formed. Then, an alkaline electrolyte composed of 7N potassium hydroxide (KOH) water solution is injected into the outer casing can 37. Furthermore, the sealing cover 38 is placed on the positive current collector lead 10. The insulating gasket 39 has been beforehand fit on the edge of the sealing cover 38.

Then, as shown in FIG. 9, welding electrodes W1 and W2 are caused to contact with an upper part of the sealing cover 38 and a lower part of the outer casing can 37, respectively. Energization processing is performed between the welding electrodes W1 and W2. Specifically, while a pressure of $2 \times 10^6$ [N/m$^2$] is applied, a voltage of 24 [V] is applied, and a welding current of 3 [kA] is applied for 15 [msec.], for example. As a result, the sealing cover 38 is welded and joined to the positive current collector lead 10 at four projections 13b formed in the cylinder top part 13 of the positive current collector lead 10 (see FIG. 7A to FIG. 7C and FIG. 8) as welding points.

Then, a force is applied in a direction opposite to the Z-axis direction from the sealing cover 38 and the can bottom of the outer casing can 37 (a force shown by an arrow in FIG. 9), pressing process is performed on the outer casing can 37 and the positive current collector lead 10 in the Z-axis direction until the reduced-diameter part 37a as shown in FIG. 3 is formed. Finally, the opening end edge 37b of the outer casing can 37 is internally caulked so as to be sealed. As a result, the cylindrical secondary battery 1 having a battery capacity of 6.0 [Ah] is completed, for example.

Here, according to the cylindrical secondary battery 1 that uses the positive current collector lead 10 relating to the first embodiment, by applying a pressure while welding and pressing and before sealing, the bent guide parts 15a, 15b, 16a, and 16b of the tab parts 15 and 16 of the positive current collector lead 10 will be easily transformed. As a result, it is possible to easily even out the variation in the overall height of the battery.

8. Advantages

According to the cylindrical secondary battery 1 relating to the first embodiment, the positive current collector plate 35 and the sealing cover 38 are connected with each other via the cylindrical part (part composed of the cylinder top part 13, the cylinder curved part 12, and the cylinder bottom part 11) of the positive current collector lead 10, and in addition, via the tab parts 15 and 16. Accordingly, compared with the cylindrical secondary battery relating to the above conventional art in which only the cylindrical part realizes the electrical connection between the positive current collector plate and the sealing cover, the cylindrical secondary battery 1 has the structure in which the energizing path between the positive current collector plate 35 and the sealing cover 38 is increased and the electrical resistance therebetween is reduced. This can reduce the output loss.

Also, according to the cylindrical secondary battery 1, without increasing the width or thickness of the cylindrical part of the positive current collector lead 10 (part composed of the cylinder top part 13, the cylinder curved part 12, and the cylinder bottom part 11), it is possible to reduce the electrical resistance between the positive current collector plate 35 and the sealing cover 38, as described above. Accordingly, a large space is unnecessary between the positive current collector plate 35 and the sealing cover 38, and an effect in energy efficiency is achieved.

Also, the cylindrical secondary battery 1 has the above structure in which the plurality of projections 11b, 13b, 15c, and 16c are formed in the positive current collector lead 10, and is welded and joined to the positive current collector plate 35 and the sealing cover 38 at the projections 11b, 13b, 15c, and 16c as welding points. By providing the projections 11b, 13b, 15c, and 16c in this way, when the positive current collector lead 10 is welded and joined to the sealing cover 38 and the positive current collector plate 35, a welding current is concentrated to parts with which the top parts of the projections 11b, 13b, 15c, and 16c contacts. This enables sure welding and joining.

Accordingly, the cylindrical secondary battery 1 relating to the first embodiment has the advantage that it is possible to reduce the output loss by the effect of the reduction in the internal electrical resistance and also maintain the high energy efficiency.

The tab parts 15 and 16 provided in the positive current collector lead 10 do not need to be bent so as to have a wave shape, as described above. Alternatively, the tab parts 15 and 16 may be each linear or circular, for example.

[Second Embodiment]

The following describes the structure of a cylindrical secondary battery 2 relating to a second embodiment, with reference to FIG. 10A to FIG. 10C and FIG. 11. The structural difference between the cylindrical secondary battery 2 relating to the second embodiment and the cylindrical secondary battery 1 relating to the first embodiment lies in the connection configuration between the positive current collector lead 50 and the positive current collector plate 35. Accordingly, the following describes only the difference.

1. Structure of Positive Current Collector Lead 50

Figure 10A:
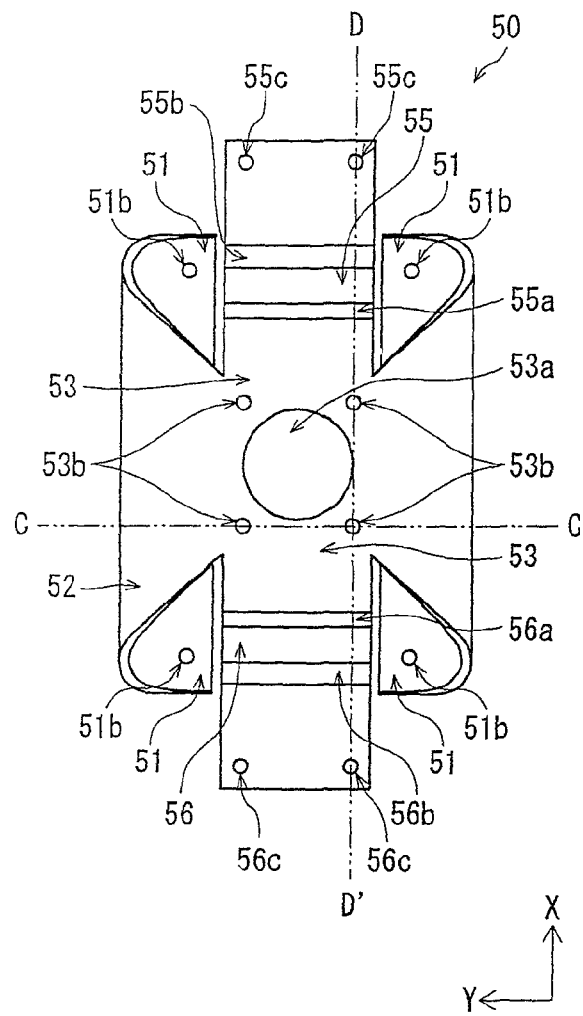
FIG. 10A is a top view showing a positive current collector lead 50 included in a cylindrical secondary battery 2 relating to a second embodiment.

As shown in FIG. 10A, the positive current collector lead 50 included in the cylindrical secondary battery 2 relating to the second embodiment also has the structure in which a cylindrical part, which is composed of a cylinder top part 53, a cylinder curved part 52, and a cylinder bottom part 51, and tab parts 55 and 56, which respectively extend upward and downward from an opening end edge of the cylinder top part 53, are integrally formed. As shown in FIG. 10B, the cylindrical part of the positive current collector lead 50 has the structure in which edge sides of the cylinder bottom part 51 oppose each other.

Figure 10C:
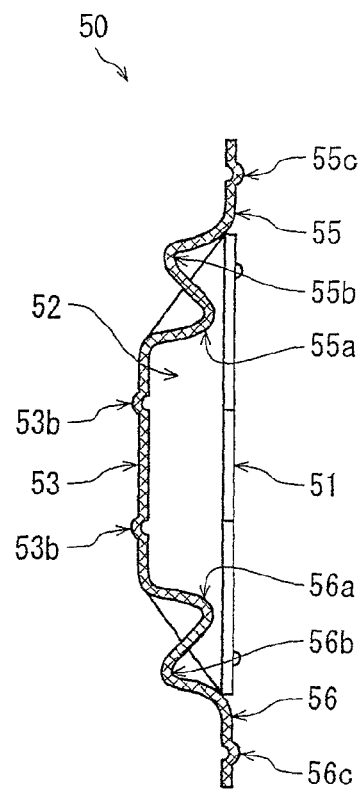
FIG. 10C is a cross sectional view showing tab parts included in the positive current collector lead 50 along a line D-D'.
Figure 10B:
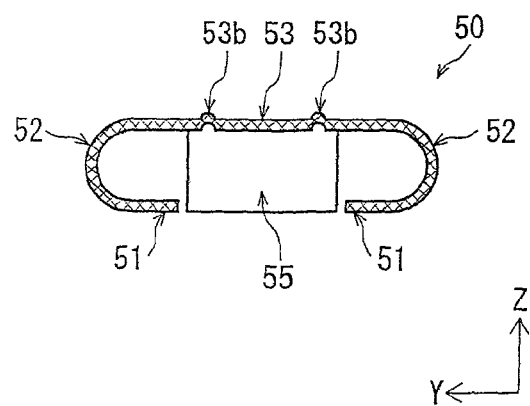
FIG. 10B is a cross sectional view showing a cylindrical part included in the positive current collector lead 50 along a line C-C'.

As shown in FIG. 10C, the positive current collector lead 50 has the structure in which a wave shape of each of the tab parts 55 and 56 has a larger amplitude in a lower part thereof in the Z-axis direction, and the position of wave troughs 55a and 56a in the positive current collector lead 50 is lower than the position of the wave troughs 15a and 16a in the positive current collector lead 10. Note that the position of wave crests 55b and 56b of the tab parts 55 and 56 is the same as the position of those of the above positive current collector lead 10.

The positive current collector lead 50 has the structure in which a central opening 53a is provided at a center of the cylinder top part 53, and four projections 53b are provided around the central opening 53a, in the same way as the above positive current collector lead 10. Also, the positive current collector lead 50 has the structure in which four projections 51b are provided in the cylinder bottom part 51, and projections 55c and 56c are provided in tip portions of the tab parts 55 and 56, respectively.

Although not shown in the figure, the positive current collector lead 50 has the structure in which a notch having a semicircular (curved) shape is formed in a lower bottom part of the cylinder bottom part 51, in the same way as the positive current collector lead 10.

2. Connection Configuration of Positive Current Collector Lead 50 and Positive Current Collector Plate 35 of Cylindrical Secondary Battery 2

As shown in FIG. 11, the cylindrical secondary battery 2 has the same structure as the cylindrical secondary battery relating to the first embodiment in that the tip portions of the tab parts 55 and 56 of the positive current collector lead 50 are welded and joined to the positive current collector plate 35. However, according to the second embodiment, a wave trough of a part that has been bent so as to have a wave shape contacts with a main surface of the positive current collector plate 35 upward in the Z-axis direction (part E surrounded by a two-dot chain line).

The cylindrical secondary battery 2 relating to the second embodiment has the structure, as described above, in which the positive current collector lead 50 is electrically connected with the positive current collector plate 35 at the contact points in which the wave troughs of the tab parts 55 and 56 contact with the positive current collector plate 35, in addition to the welding-joining points in which the cylindrical part is welded and joined to the tip points of the tab parts 55 and 56. Accordingly, the cylindrical secondary battery 2 relating to the second embodiment can reduce the internal resistance further than the cylindrical secondary battery 1 relating to the above first embodiment.

The cylindrical secondary battery 2 relating to the second embodiment has the same structure as the cylindrical secondary battery 1 relating to the above first embodiment, and accordingly achieves the above effects in the same way.

[Third Embodiment]

Figure 12B:
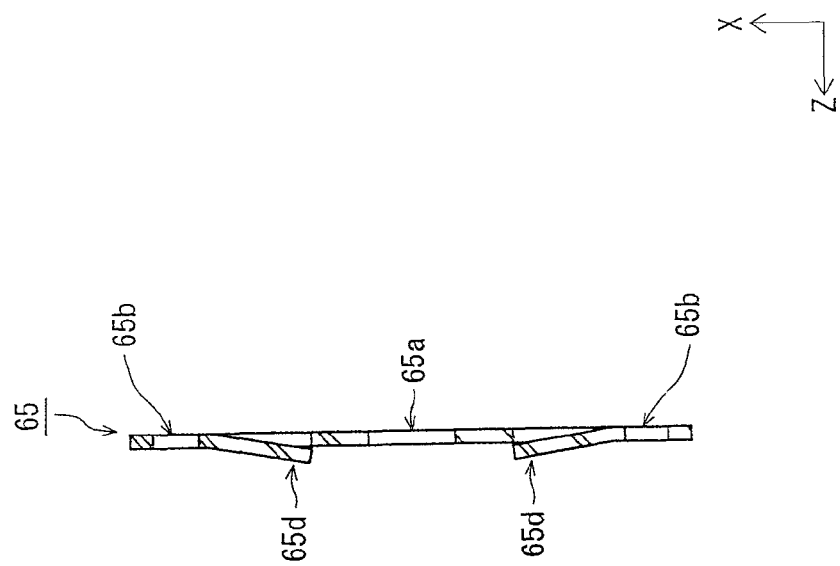
FIG. 12B is a cross sectional view showing the positive current collector plate 65 along a line F-F'.
Figure 12A:
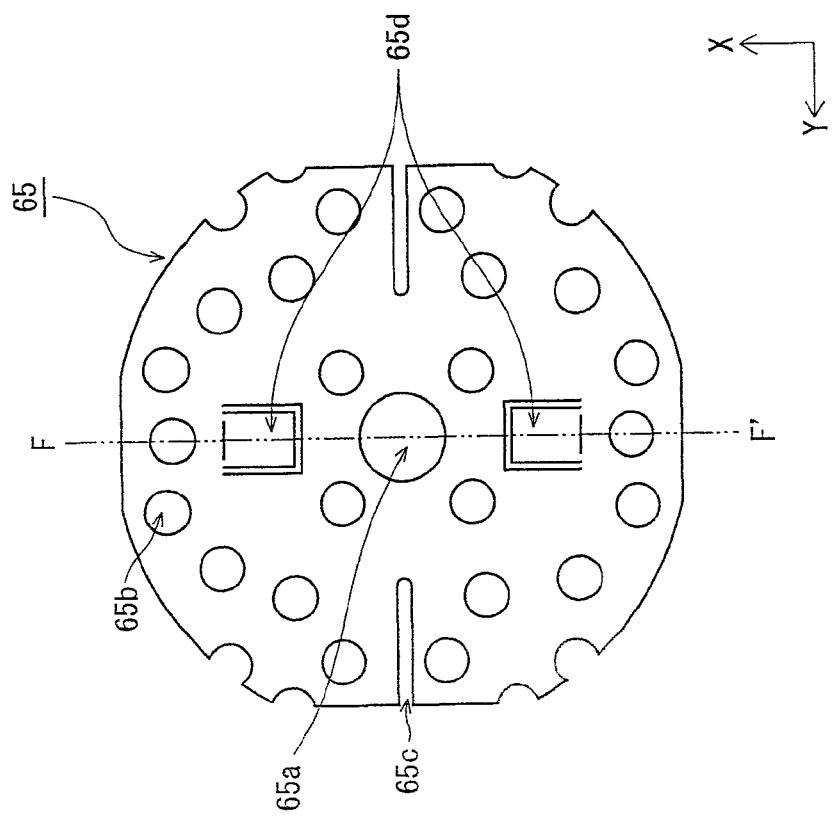
FIG. 12A is a top view showing a positive current collector plate 65 included in a cylindrical secondary battery 3 relating to a third embodiment.
Figure 13:
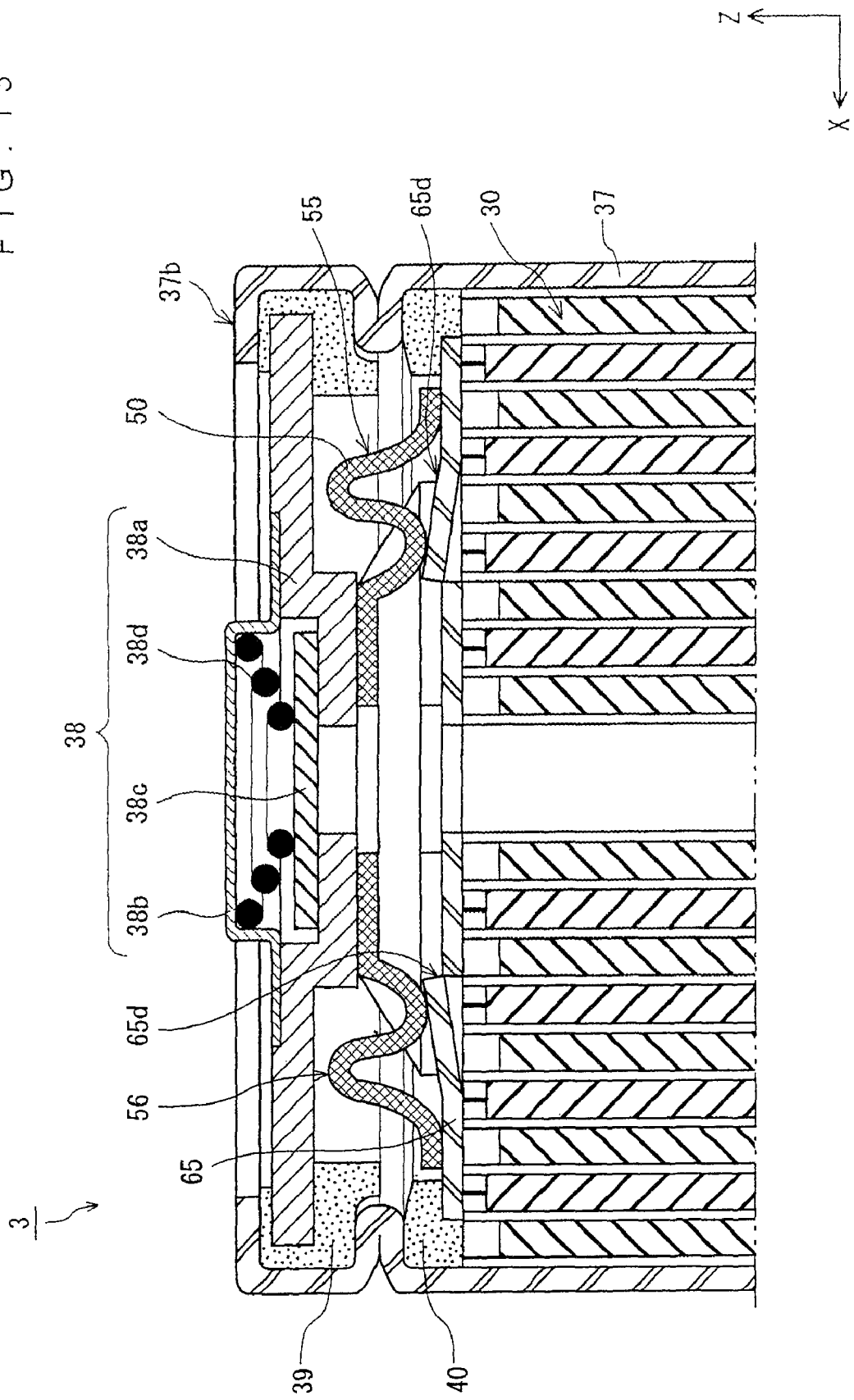
FIG. 13 is a cross sectional view showing a part of the cylindrical secondary battery 3 relating to the third embodiment.

The following describes the structure of a cylindrical secondary battery 3 relating to a third embodiment, with reference to FIG. 12A, FIG. 12B, and FIG. 13. The structural differences between the cylindrical secondary battery 3 relating to the third embodiment and the cylindrical secondary battery 2 relating to the above second embodiment lie in the structure of a positive current collector plate 65 and the connection configuration of a positive current collector lead 50 and the positive current collector plate 65. Accordingly, the following describes only the differences.

1. Structure of Positive Current Collector Plate 65

As shown in FIG. 12A, the positive current collector plate 65 included in the cylindrical secondary battery 3 relating to the third embodiment is a substantially circular plate, has a central opening 65a at a center thereof, and has a plurality of burring holes 65b on a surface thereof. Also, slits 65c are provided in each of left and right outer circumferences in the Y-axis direction so as to extend in the diameter direction. These structures of the positive current collector plate 65 are the same as the structures of the positive current collector plate 35 included in the cylindrical secondary batteries 1 and 2 respectively relating to the first and second embodiments.

As shown in FIG. 12A and FIG. 12B, the positive current collector plate 65 relating to the third embodiment has two cut-and-raised part 65d provided therein. As shown in FIG. 12B, the cut-and-raised parts 65d provided in the positive current collector plate 65 are cut and raised upward in the Z-axis direction. That is, the cut-and-raised parts 65d are cut and raised, so as to be closer to the positive current collector lead 50 when housed in the outer casing can 37.

Since FIG. 12B schematically shows the positive current collector plate 65, burring projections are not shown. Actually, the burring projections project downward in the Z-axis direction.

2. Connection Configuration of Positive Current Collector Lead 50 and Positive Current Collector Plate 65 of Cylindrical Secondary Battery 3

As shown in FIG. 13, the cylindrical secondary battery 3 has the same structure as the above cylindrical secondary batteries 1 and 2 in that the tab parts 55 and 56 of the positive current collector lead 50 are welded and joined to the positive current collector plate 35 at tip portions thereof. Also, the cylindrical secondary battery 3 has the same structure as the above cylindrical secondary batteries 1 and 2 in that wave troughs of the tab parts 55 and 56 of the positive current collector lead 50 contact with an upper main surface of the positive current collector plate 65 in the Z-axis direction. According to the third embodiment, the two cut-and-raised parts 65d are provided in the positive current collector plate 65. The two cut-and-raised parts 65d correspond in position to the wave troughs of the tab parts 55 and 56 provided in the positive current collector lead 50, and accordingly the wave troughs contact with the cut-and-raised parts 65d of the positive current collector plate 65.

According to the cylindrical secondary battery 3 relating to the third embodiment as described above, the two cut-and-raised parts 65d are provided in the positive current collector plate 65, and the wave troughs of the tab parts 55 and 56 provided in the positive current collector lead 50 contact with the two cut-and-raised parts 65d. As a result, the cylindrical secondary battery 3 can realize the electrical connection at the cut-and-raised parts 65d more surely than the cylindrical secondary battery 2 relating to the above second embodiment, and accordingly can suppress the output variation by the effect of pressure.

Therefore, the cylindrical secondary battery 3 relating to the third embodiment can reduce the internal resistance further than the cylindrical secondary battery 2 relating to the second embodiment.

Other structures of the cylindrical secondary battery 3 relating to the third embodiment are the same as those of the cylindrical secondary batteries 1 and 2 respectively relating to the above first and second embodiments, and accordingly the cylindrical secondary battery 3 can achieve the above effects in the same way as the cylindrical secondary batteries 1 and 2.

[Fourth Embodiment]

The following describes a cylindrical secondary battery 4 relating to a fourth embodiment, with reference to FIG. 14A to FIG. 14C and FIG. 15. The structural differences between the cylindrical secondary battery 4 relating to the fourth embodiment and the cylindrical secondary batteries 1 and 2 respectively relating to the above first and second embodiments lie in the structure of the positive current collector lead 70 and the connection configuration of the positive current collector lead 70 and the positive current collector plate 35. Accordingly, the following describes only the differences.

1. Structure of Positive Current Collector Lead 70

As shown in FIG. 14A, the positive current collector lead 70 included in the cylindrical secondary battery 4 relating to the fourth embodiment has the structure in which a cylindrical part, which is composed of a cylinder top part 73, a cylinder curved part 72, and a cylinder bottom part 71, and tab parts 75 and 76, which respectively extend upward and downward from an opening end edge of the cylinder top part 73, are integrally formed. As shown in FIG. 14B, the cylindrical part of the positive current collector lead 70 has the structure in which edge sides of the cylinder bottom part 71 oppose each other.

As shown in FIG. 14C, the positive current collector lead 70 has the structure in which a wave shape of each of the tab parts 75 and 76 has a larger amplitude in an upper part in the Z-axis direction. The position of wave crests 75b and 76b is higher than the position of the wave crests 15b and 16b in the positive current collector lead 50. Note that the position of the wave troughs 75a and 76a of the tab parts 75 and 76 is the same as the position of those of the above positive current collector lead 50.

The positive current collector lead 70 has the structure in which a central opening 73a is provided at a center of the cylinder top part 73, and four projections 73b are provided around the central opening 73a, in the same way as the positive current collector lead 50. Also, the positive current collector lead 70 has the structure in which four projections 71b are provided in the cylinder bottom part 71, and projections 75c and 76c are provided in tip portions of the tab parts 75 and 76, respectively.

Although not shown in the figure, the positive current collector lead 70 has the structure in which a notch having a semicircular (curved) shape is formed in a lower bottom part of the cylinder bottom part 71, in the same way as the above positive current collector leads 10 and 50.

2. Connection Configuration of Positive Current Collector Lead 70 and Positive Current Collector Plate 35 of Cylindrical Secondary Battery 4

As shown in FIG. 15, the cylindrical secondary battery 4 has the same structure as the above cylindrical secondary battery 2 in that the tab parts 75 and 76 of the positive current collector lead 70 are welded and joined to the positive current collector plate 35 at tip portions thereof. Also, the cylindrical secondary battery 4 has the same structure as the above cylindrical secondary battery 2 in that the wave troughs of the tab parts 75 and 76 of the positive current collector lead 70 contact with an upper main surface of the positive current collector plate 35 in the Z-axis direction. The cylindrical secondary battery 4 relating to the fourth embodiment further has the structure in which the wave crests of the tab parts 75 and 76 of the positive current collector lead 70 contact with a sealing plate 38a of a sealing cover 38.

According to the cylindrical secondary battery 4 relating to the fourth embodiment as described above, the positive current collector lead 70 is electrically connected with the positive current collector plate 35 at the contact points in which the wave troughs of the tab parts 75 and 76 contact with the positive current collector plate 35 and the contact points in which the wave crests of t the tab parts 75 and 76 contact with the sealing cover 38, in addition to the welding-joining points in which the cylindrical part is welded and joined to the tip portions of the tab parts 75 and 76. Accordingly, the cylindrical secondary battery 4 relating to the fourth embodiment can reduce the internal resistance further than the cylindrical secondary battery 2 relating to the above second embodiment.

Other structures of the cylindrical secondary battery 4 relating to the fourth embodiment are the same as those of the cylindrical secondary batteries 1 and 2 respectively relating to the above first and second embodiments, and accordingly the cylindrical secondary battery 4 can achieve the above effects in the same way as the cylindrical secondary batteries 1 and 2.

[Fifth Embodiment]

The following describes the structure of a cylindrical secondary battery 5 relating to a fifth embodiment, with reference to FIG. 16. The structural differences between the cylindrical secondary battery 5 relating to the fifth embodiment and the cylindrical secondary battery 4 relating to the above fourth embodiment lie in the structure of a positive current collector plate 65 and the connection configuration of the positive current collector lead 70 and the positive current collector plate 65. Accordingly, the following describes only the differences.

As shown in FIG. 16, the positive current collector plate 65 is adopted as the cylindrical secondary battery 5 relating to the fifth embodiment. In other words, in the same way as in the above second embodiment, parts of the positive current collector plate 65 with which wave troughs of the tab parts 75 and 76 of the positive current collector lead 70 contact are cut and raised (cut-and-raised part 65d).

The cylindrical secondary battery 5 relating to the fifth embodiment has the structure in which the two cut-and-raised parts 65d are provided in the positive current collector plate 65, and the wave troughs of the tab parts 75 and 76 provided in the positive current collector lead 70 contact with the two cut-and-raised parts 65d, as described above. As a result, the cylindrical secondary battery 5 can realize the electrical connection at the cut-and-raised parts 65d more surely than the cylindrical secondary battery 4 relating to the above fourth embodiment, and accordingly can suppress the output variation by the effect of pressure.

Therefore, the cylindrical secondary battery 5 relating to the fifth embodiment can suppress the output variation further than the cylindrical secondary battery 4 relating to the above fourth embodiment.

Other structures of the cylindrical secondary battery 5 relating to the fifth embodiment are the same as those of the cylindrical secondary battery 4 relating to the above fourth embodiment, and accordingly the cylindrical secondary battery 5 can achieve the above effects in the same way as the cylindrical secondary battery 4.

[Sixth Embodiment]

The following describes a cylindrical secondary battery 6 relating to a sixth embodiment, with reference to FIG. 17A to FIG. 17C and FIG. 18. The structural differences between the cylindrical secondary battery 6 relating to the sixth embodiment and the cylindrical secondary battery 3 relating to the above third embodiment lie in the structure of a positive current collector lead 80 and the connection configuration of the positive current collector lead 80 and a positive current collector plate 65. Accordingly, the following describes only the differences.

1. Structure of Positive Current Collector Lead 80

Figure 17A:
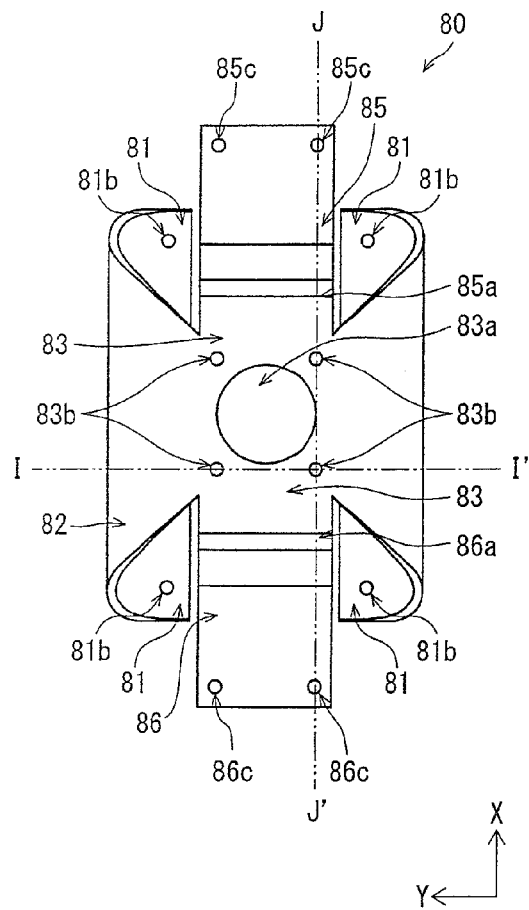
FIG. 17A is a top view showing a positive current collector lead 80 included in a cylindrical secondary battery 6 relating to a sixth embodiment.

As shown in FIG. 17A, in the same way as the above positive current collector lead 50, the positive current collector lead 80 included in the cylindrical secondary battery 6 relating to the sixth embodiment has the structure in which a cylindrical part, which is composed of a cylinder top part 83, a cylinder curved part 82, and a cylinder bottom part 81, and tab parts 85 and 86, which respectively extend upward and downward from an opening end edge of the cylinder top part 83 in the X-axis direction, are integrally formed. As shown in FIG. 17B, the cylindrical part of the positive current collector lead 80 has the structure in which edge sides of the cylinder bottom part 81 oppose each other.

Figure 17C:
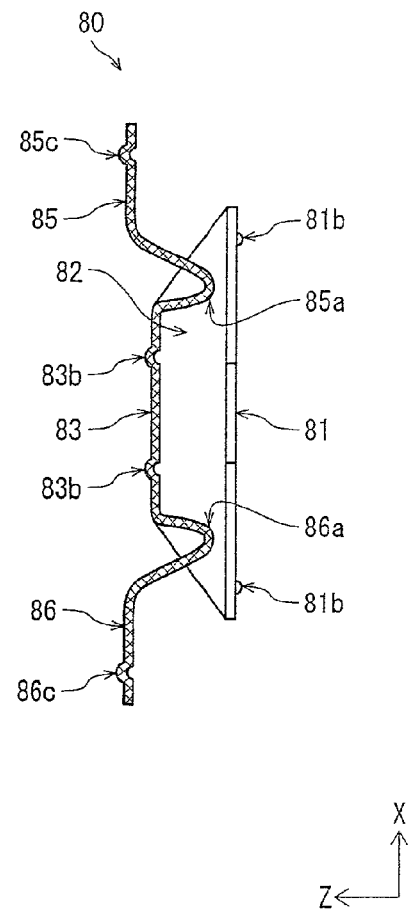
FIG. 17C is a cross sectional view showing tab parts included in the positive current collector lead 80 along a line J-J'.
Figure 17B:
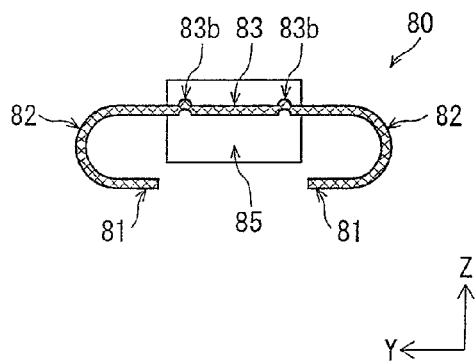
FIG. 17B is a cross sectional view showing a cylindrical part included in the positive current collector lead 80 along a line I-I'.

As shown in FIG. 17C, the positive current collector lead 80 has the structure in which tip portions of the tab parts 85 and 86 are located above the cylinder top part 83 in the Z-axis direction. That is, the tab parts 85 and 86 are bent at wave troughs 85a and 86a so as to bound in the Z-axis direction. Projections 85c and 86c of the tip portions of the tab parts 85 and 86 are each convex upward in the Z-axis direction, that is, convex toward a side of the sealing cover 38.

In the same way as the above positive current collector lead 50, the positive current collector lead 80 has the structure in which a central opening 83a is provided at a center of the cylinder top part 83, four projections 83b are provided around the central opening 83a. Also, four projections 81b are provided in the cylinder bottom part 81.

Although not shown in the figure, the positive current collector lead 80 also has the structure in which a notch having a semicircular (curved) shape is formed in a lower bottom part of the cylinder bottom part 81, in the same way as the above positive current collector leads 10 and 50.

2. Connection Configuration of Positive Current Collector Lead 80 and Positive Current Collector Plate 65 of Cylindrical Secondary Battery 6

As shown in FIG. 18, the cylindrical secondary battery 6 has the same structure as the cylindrical secondary battery 3 relating to the above third embodiment in that wave troughs of the tab parts 85 and 86 of the positive current collector lead 80 contact with the two cut-and-raised parts 65d of the positive current collector plate 65. The cylindrical secondary battery 6 relating to the sixth embodiment has the structure in which tip portions of the tab parts 85 and 86 are welded and joined to the sealing plate 38a of the sealing cover 38. Note that the tip portions of the tab parts 85 and 86 are welded and joined to the sealing plate 38a using the welding electrodes W1 and W2, in the same way as shown in FIG. 9.

According to the cylindrical secondary battery 6 relating to the sixth embodiment as described above, the two cut-and-raised parts 65d are provided in the positive current collector plate 65, and contact with the wave troughs of the tab parts 85 and 86 of the positive current collector lead 80. As a result, the cylindrical secondary battery 6 can realize the electrical connection at the cut-and-raised parts 65d more surely than the cylindrical secondary battery 2 relating to the above second embodiment, and accordingly can suppress the output variation by the effect of pressure.

Furthermore, the cylindrical secondary battery 6 relating to the sixth embodiment has the structure in which the tip portions of the tab parts 85 and 86 provided in the positive current collector lead 80 are welded and joined to the sealing plate 38*a* of the sealing cover 38. This can more ensure the electrical connection between the sealing cover 38 and the positive current collector lead 80, and reduce the electrical resistance therebetween.

Accordingly, the cylindrical secondary battery 6 relating to the sixth embodiment also can reduce the internal resistance.

CONFIRMATORY EXPERIMENT

Cylindrical secondary batteries respectively relating to Examples 1-6 and a Comparative Example, which have the structures shown below, are made as samples.

Example 1

The cylindrical secondary battery 1 relating to the first embodiment shown in FIG. 3 is adopted.

Example 2

The cylindrical secondary battery 2 relating to the second embodiment shown in FIG. 11 is adopted.

Example 3

The cylindrical secondary battery 3 relating to the third embodiment shown in FIG. 13 is adopted.

Example 4

The cylindrical secondary battery 4 relating to the fourth embodiment shown in FIG. 15 is adopted.

Example 5

The cylindrical secondary battery 5 relating to the fifth embodiment shown in FIG. 16 is adopted.

Example 6

The cylindrical secondary battery 6 relating to the sixth embodiment shown in FIG. 18 is adopted.

COMPARATIVE EXAMPLE

Figure 1:
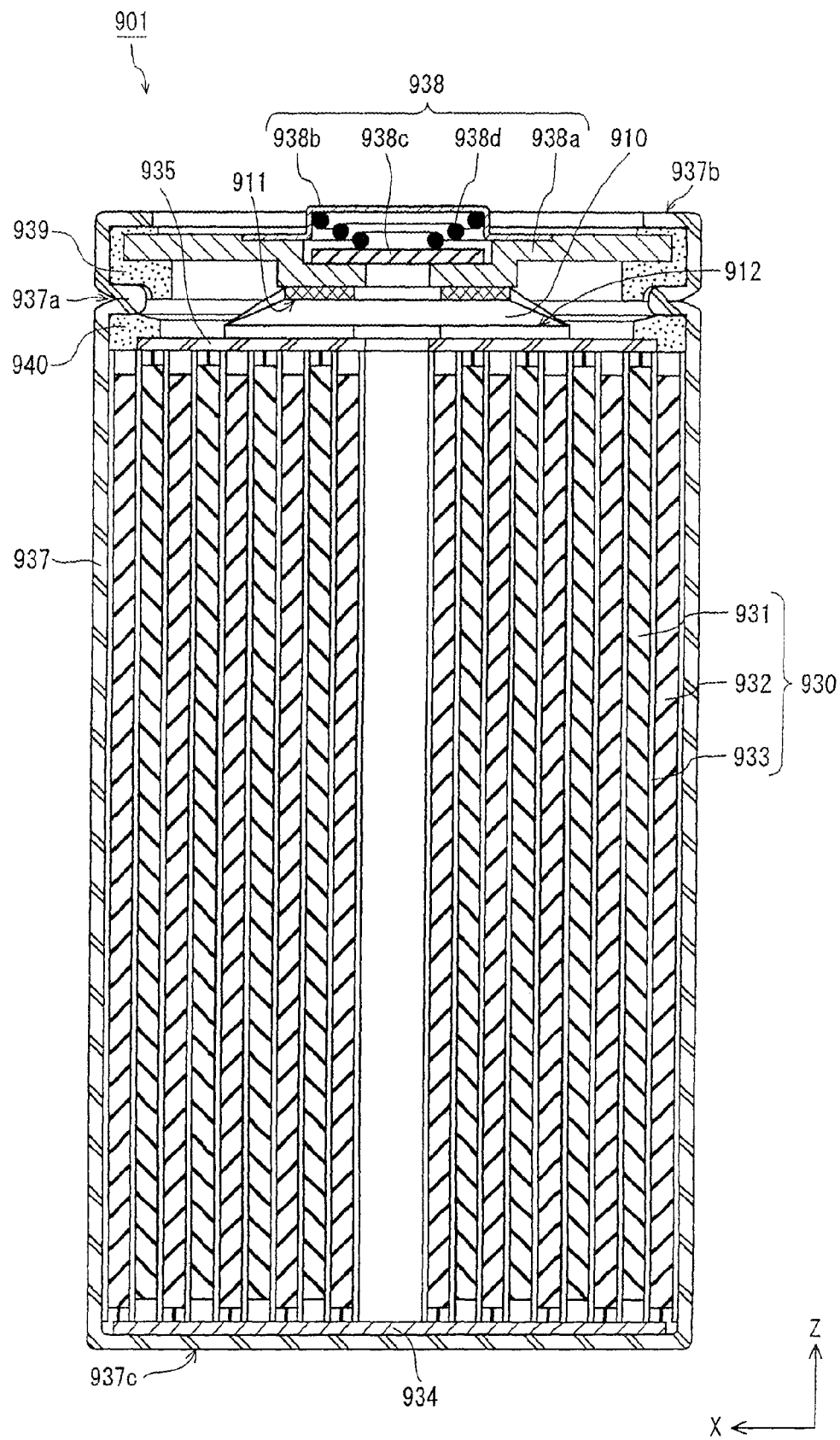
FIG. 1 is a cross sectional view showing a cylindrical secondary battery 901 relating to a conventional art.
Figure 2B:
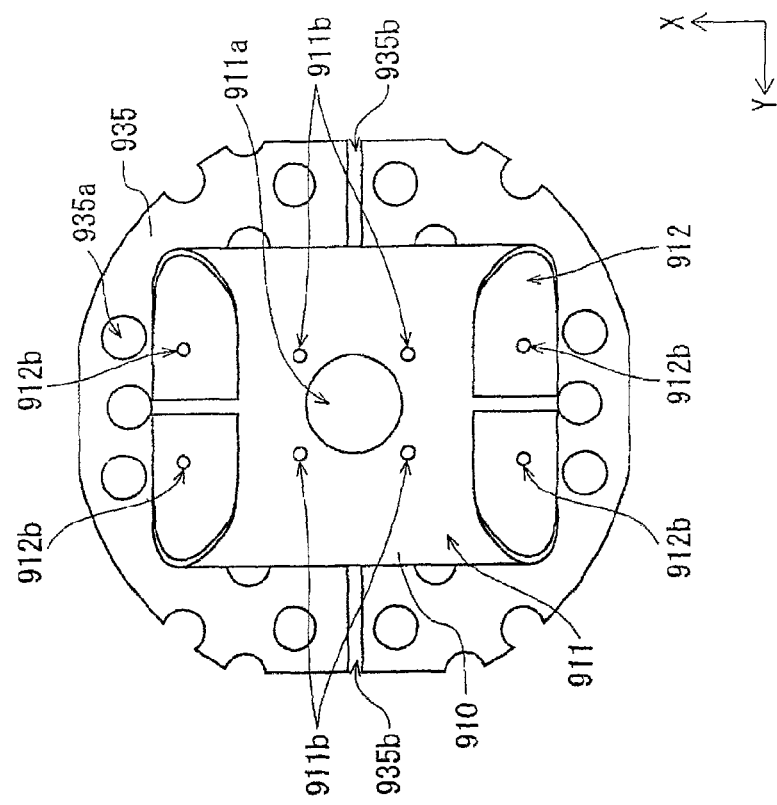
FIG. 2B is a top view showing the positive current collector lead 910 included in the cylindrical secondary battery 901 relating to the conventional art, which is joined to a positive current collector plate 935.
Figure 2A:
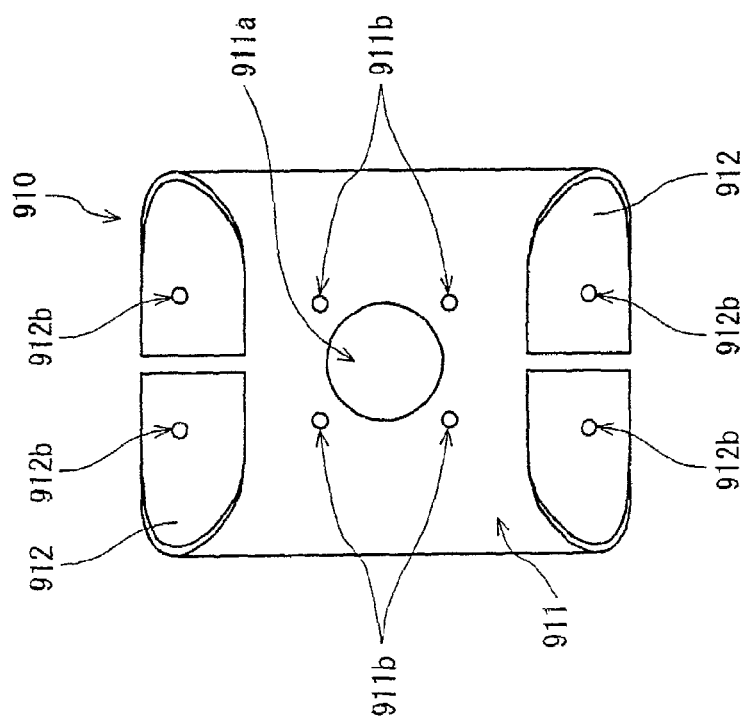
FIG. 2A is a top view showing a positive current collector lead 910 included in the cylindrical secondary battery 901 relating to the conventional art.

The cylindrical secondary battery 901 relating to the conventional art shown in FIG. 1 is adopted.

The cylindrical secondary batteries 1 to 6 and 901 respectively relating to the Example 1 to 6 and the Comparative Example have the common size, materials, and the like, except for the structures of the positive current collector leads 10, 50, 70, 80, and 910 or the structures of the positive current collector plates 35, 65, and 935. Also, after completion of each of the cylindrical secondary batteries relating to the samples, active charge/discharge is performed at the nominal capacity of 6.0 [Ah].

(Evaluation Method)

Evaluation is performed under an environment of 25[° C.] by charging the battery with a current of 1 [It] to 50[%] with respect to the capacity of the battery. After a pause for 1 [hr.], discharge and charge each at 10 [sec.] are repeatedly performed to the maximum 200 [A] (per 40 [A]). Then, a current at 0.9 [V] is calculated as an output [A] based on a straight line between each of the discharge currents and 10-second voltage, using the least-square method. Table. 1 shows result data of the calculation.

In Table. 1, the battery output of the sample relating to the Comparative Example is "100", and the output [%] and the output variation relating to each of the samples relating to the Examples 1-6 are shown.

TABLE 1

| | Welding target | Contact | Contact target | Cut & raised portion in positive current collector plate | Output ratio [%] | Output variation [%] |
|---|---|---|---|---|---|---|
| Comparison | — | — | — | — | 100 | ±1 |
| Example 1 | Current collector plate | No | — | No | 109 | ±1 |
| Example 2 | Current collector plate | Yes | Current collector plate | No | 113 | ±2 |
| Example 3 | Current collector plate | Yes | Current collector plate | Yes | 113 | ±1 |
| Example 4 | Current collector plate | Yes | Current collector plate & sealing cover | No | 115 | ±2 |
| Example 5 | Current collector plate | Yes | Current collector plate & sealing cover | Yes | 115 | ±1 |
| Example 6 | Sealing cover | Yes | Current collector plate | Yes | 113 | ±1 |

(Consideration)

According to the sample relating to the Comparative Example, a current pathway between the positive current collector plate 935 and the sealing cover 938 is the positive current collector lead 910 that is composed of only part having a cylindrical shape. As a result, the resistance loss occurs while a current is applied, and a sufficient output cannot be obtained.

On the other hand, according to the sample relating to the Example 1, a current pathway between the positive current collector plate 35 and the sealing cover 38 is the positive current collector lead 10 having a plurality of pathways that are the cylindrical part and the tab parts 15 and 16. As a result, the resistance loss is reduced, and a high output is obtained (109[%] with respect to the Comparative Example).

Also, according to the sample relating to the Example 2, the wave troughs of the tab parts 55 and 56 provided in the positive current collector lead 50 on which pressurization process has been performed are contact with the positive current collector plate 35 (see FIG. 11). As a result, an energizing path between the positive current collector plate 35 and the sealing cover 38 is reduced. Accordingly, the sample relating to the Example 2 more improves the output efficiency (113[%] with respect to the Comparative Example). Note that, when the battery is assembled and pressed, the tab parts 55 and 56 provided in the positive current collector lead 50 are squashed, and the wave troughs of the tab parts 55 and 56 provided in the positive current collector lead 50 contact with the positive current collector plate 35. The variation in the contact pressure makes the output variation large (the output variation of ±2[%]).

Next, according to the sample relating to the Example 3, the cut-and-raised parts 65d are provided in the positive current collector plate 65 (see FIG. 12A, FIG. 12B, and FIG. 13), compared with the sample relating to the Example 2. The wave troughs of the tab parts 55 and 56 provided in the positive current collector lead 50 on which pressurization process has been performed contact with the cut-and-raised parts 65d. As a result, the output variation is reduced (the output variation of ±1 [%]).

According to the sample relating to the Example 4, the wave troughs of the tab parts 75 and 76 provided in the positive current collector lead 70 on which pressurization process has been performed contact with the positive current collector plate 35, and the wave crests contact with the sealing cover 38 (see FIG. 15). As a result, an energizing path between the positive current collector plate 35 and the sealing cover 38 is increased, and the output is further improved (115[%] with respect to the Comparative Example).

Also, the sample relating to the Example 5 has, in addition to the structure of the sample relating to the Example 4, the structure in which the cut-and-raised parts 65d are provided in the positive current collector plate 65 (see FIG. 16). Accordingly, the output variation can be reduced (the output variation of ±1[%]), compared with the sample relating to the Example 4.

Lastly, according to the sample relating to the Example 6, the tip portions of the tab parts 85 and 86 provided in the positive current collector lead 80 are joined to the sealing cover 38 (see FIG. 18). Also in this case, the wave troughs of the tab parts 85 and 86 provided in the positive current collector lead 80 on which pressurization process has been performed contact with the cut-and-raised parts 65d provided in the positive current collector plate 65. As a result, an energizing path between the positive current collector plate 65 and the sealing cover 38 is increased, and the output is improved (113 [%] with respect to the Comparative Example).

[Others]

In the above first to sixth embodiments, the nickel-hydrogen secondary battery has been used as one example. Alternatively, it may be possible to apply the present invention to an alkaline secondary battery such as a nickel-cadmium secondary battery or a lithium-ion secondary battery.

Also, in the above first to sixth embodiments, each two tab parts 15 and 16, 55 and 56, 75 and 76, and 85 and 86 are provided in the positive current collector leads 10, 50, 70, and 80. Alternatively, the number of tab parts to be formed may be one or more than three.

Also, in the above first to sixth embodiments, the positive current collector leads 10, 50, 70, and 80 respectively have the structures in which the cylindrical part is integrally formed with the tab parts 15 and 16, 55 and 56, 75 and 76, and 85 and 86. However, these do not necessarily need to be integrally formed. For example, the tab parts may be attached to the cylindrical part by performing welding or soldering.

Also, in the above first to sixth embodiments, the tab parts 15 and 16, 55 and 56, 75 and 76, and 85 and 86 respectively provided in the positive current collector leads 10, 50, 70, and 80 each have an S shape in which the wave crest or the wave trough is bent with a curvature. Alternatively, the tab parts each may have a Z-shape in which the wave crest or the wave trough is bent with an angle.

Also, in the above third, fifth, and sixth embodiments, the cut-and-raised parts 65d provided in the positive current collector plate 65 contact with the tab parts 55 and 56, 75 and 76, and 85 and 86 respectively provided in the positive current collector leads 50, 70, and 80. Alternatively, in addition to the contact, the cut-and-raised parts 65d may be engaged with or fit to the tab parts.

Furthermore, the tab parts provided in the positive current collector lead may be welded and joined to the sealing cover 38. Also, the wave crest or the wave trough of the part bent to have a wave shape may contact with the positive current collector plate.

Furthermore, when the cylindrical secondary battery has a negative electrode in a side in which the sealing cover 38 is provided, the above structure may be adopted and as a negative current collector lead, and also, the above structure may be adopted as a negative current collector plate.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be constructed as being included therein.

What is claimed is:

1. A cylindrical secondary battery, comprising:
an electrode assembly that is composed of a positive electrode plate and a negative electrode plate with a separator therebetween that are overlaid with each other and spirally wound;
an outer casing that has a cylindrical shape with a closed bottom, and houses therein the electrode assembly;
a sealing cover that seals an opening of the outer casing, and is one of electrode terminals;
a current collector assembly that is inserted between the electrode assembly and the sealing cover, and electrically connects the sealing cover with a core of one of the positive electrode plate and the negative electrode plate, wherein
the current collector assembly is composed of a combination of (i) a current collector plate having a plate shape that is provided on an end surface of the electrode assembly in a side in which the sealing cover is provided, and is joined to the core and (ii) a current collector lead that includes a cylindrical part having an axis in a direction along a main surface of the current collector plate, the cylindrical part includes a top part and a bottom part whose peripheral surfaces oppose each other, the top part is welded and joined to a sealing plate that is a bottom surface of the sealing cover, and the bottom part is welded and joined to the current collector plate, the current collector lead further includes at least one tab part having a rectangle shape that extends from an opening edge of the cylindrical part in a direction of the axis, the tab part has a middle portion bent to have a wave shape with an amplitude in a direction that connects the current collector plate with the sealing cover, the middle portion being between a root portion and a tip portion of the tab part, the tab part is electrically connected with the current collector plate at the tip portion by welding and joining the tip portion to the current collector plate, and the tab part contacts with the current collector plate at a wave trough of the middle portion, and is further electrically connected with the current collector plate at the wave trough.

2. The cylindrical secondary battery of claim 1, wherein the middle portion is bent to have an S-shape or a Z-shape, and contacts with the sealing cover at a wave crest of the middle portion.

3. The cylindrical secondary battery of claim 1, wherein a part of the current collector plate with which the wave trough contacts is cut and raised toward the tab part.

4. The cylindrical secondary battery of claim 1, wherein the tab part extends from the opening edge of the top part of the cylindrical part.

5. The cylindrical secondary battery of claim 1, wherein the current collector lead has a plurality of projections formed therein, and is welded and joined to the current collector plate and the sealing cover at the projections as welding points.

6. The cylindrical secondary battery of claim 1, wherein the current collector lead is a single metal plate that has been bent.

7. The cylindrical secondary battery of claim 1, wherein the cylindrical part of the current collector lead is flat, and has a height, in a connection direction that connects the current collector plate with the sealing cover, that is smaller than a width in a direction perpendicular to the connection direction.

\* \* \* \* \*